(12) United States Patent
Bullington et al.

(10) Patent No.: US 11,813,844 B2
(45) Date of Patent: Nov. 14, 2023

(54) METHOD FOR RECONFIGURING A MEDIA PRINTER TO OPTIMIZE SINGLE MEDIA PRINTING

(71) Applicant: LSINC Corporation, Huntsville, AL (US)

(72) Inventors: James Richard Bullington, Athens, AL (US); Cody Landon Curtsinger, Madison, AL (US); Corey Michael Maxwell-Swarthout, Huntsville, AL (US); Joshua Boyd Jordan, Harvest, AL (US); Michael Edward Freeman, Huntsville, AL (US); Bryan Matthew Kusek, Owens Cross Roads, AL (US)

(73) Assignee: LSINC Corporation, Huntsville, AL (US)

( * ) Notice: Subject to any disclaimer, the term of this patent is extended or adjusted under 35 U.S.C. 154(b) by 0 days.

(21) Appl. No.: 18/083,858

(22) Filed: Dec. 19, 2022

(65) Prior Publication Data

US 2023/0126054 A1    Apr. 27, 2023

Related U.S. Application Data

(63) Continuation-in-part of application No. 16/796,644, filed on Feb. 20, 2020, now Pat. No. 11,559,983, which is a continuation-in-part of application No. 16/526,604, filed on Jul. 30, 2019, now Pat. No. 10,710,378, and a continuation-in-part of application No. 16/526,731, filed on Jul. 30, 2019, now Pat. No. 11,020,987.

(Continued)

(51) Int. Cl.
*B41J 29/38* (2006.01)
*B41J 11/00* (2006.01)

(52) U.S. Cl.
CPC .............................. *B41J 11/00214* (2021.01)

(58) Field of Classification Search
CPC ......... B41J 3/4073; B41J 29/02; B41J 2/1752
See application file for complete search history.

(56) References Cited

U.S. PATENT DOCUMENTS 8,926,047 B2 * 1/2015 LaCaze .................. B41J 3/4073
101/40
9,744,776 B2 * 8/2017 Moehringer ............ B05B 15/68
(Continued)

*Primary Examiner* — Lam S Nguyen
(74) *Attorney, Agent, or Firm* — The Gache Law Firm, P.C.; Russell C. Gache

(57) ABSTRACT

A method is disclosed to provide a DTS machine that is simple to operate and can through human operator control provide economic and competitive throughput speeds as compared to more complex DTS machines utilizing multiple printing tunnels and material handlers. The present method repositions a print carriage and a reconfigures an inkjet printhead bank to accommodate different sizes and shapes of media. The allows for the printing of a single piece of media in a single each printing event, but maintains a printing throughput similar to DTS machines having the capability to print media in parallel printing events. Media is moved from a media loading area on the machine by a single operator into a printing tunnel and then the operator adjusts the angle of the media relative to a reconfigurable array of ink-heads to meet inkjet expression distance requirements.

18 Claims, 26 Drawing Sheets

Related U.S. Application Data

(60) Provisional application No. 62/830,864, filed on Apr. 8, 2019.

(56) References Cited

U.S. PATENT DOCUMENTS

| | | |
|---|---|---|
| 9,789,701 B1 | 10/2017 | Ireland et al. |
| 10,710,378 B1 | 7/2020 | Bullington et al. |
| 11,396,191 B1 | 7/2022 | Bullington et al. |
| 2006/0203024 A1 | 9/2006 | Kusunoki |
| 2016/0347099 A1 | 12/2016 | Ernst et al. |
| 2020/0171852 A1 | 6/2020 | Cofler |
| 2022/0072853 A1 | 3/2022 | Chang et al. |

\* cited by examiner

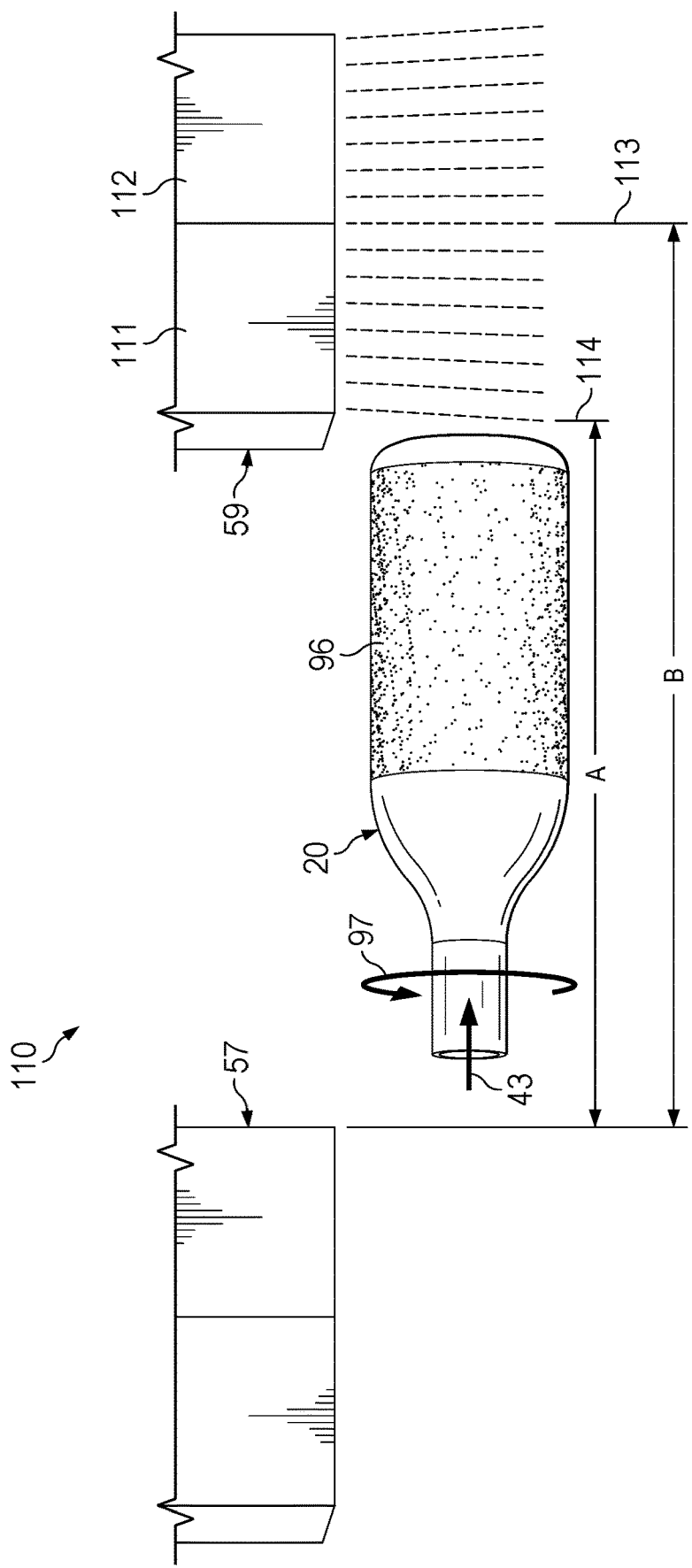

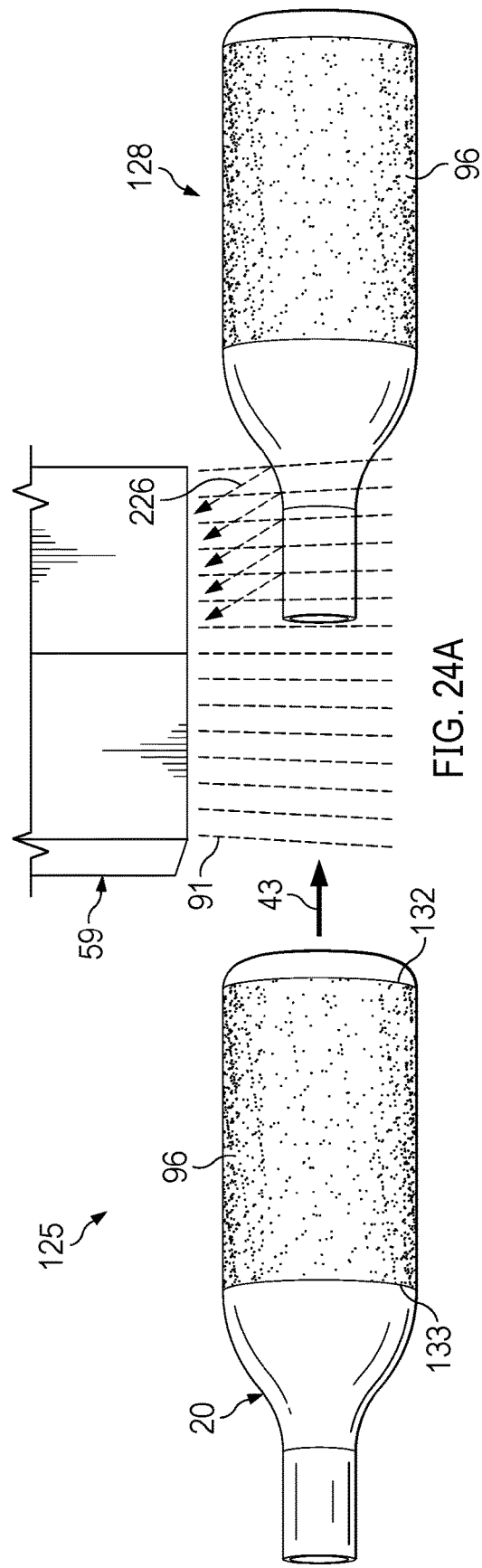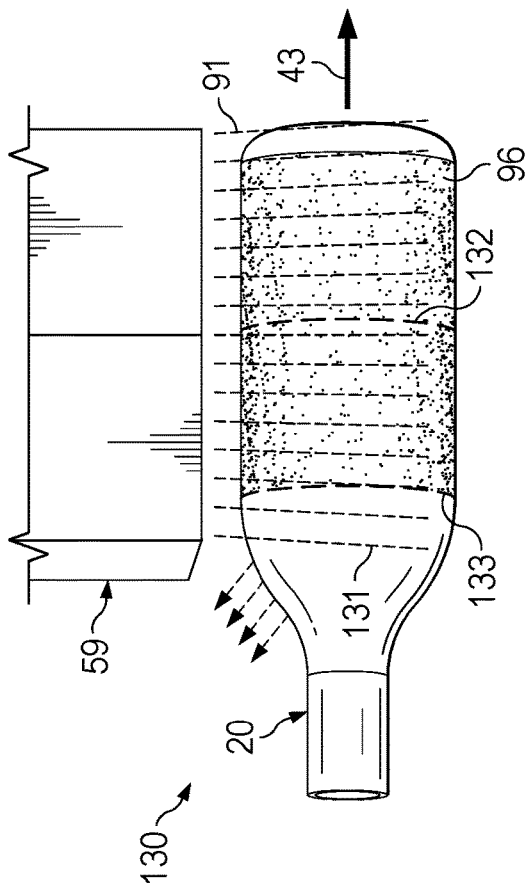

METHOD FOR RECONFIGURING A MEDIA PRINTER TO OPTIMIZE SINGLE MEDIA PRINTING

This application claims the benefit of filing priority under 35 U.S.C. § 119 and 37 C.F.R. § 1.78 of U.S. application Ser. No. 16/796,644, which claims priority in U.S. application Ser. No. 16/526,731, which claims priority in provisional U.S. application No. 62/830,864 filed Apr. 8, 2019. This application also claims priority in pending U.S. application Ser. No. 16/796,644, which claims priority in U.S. application Ser. No. 16/526,604, which claims priority in U.S. provisional application No. 62/830,864. All information disclosed in those prior applications is hereby incorporated by reference.

FIELD OF THE INVENTION

The present invention relates generally to the printing of images on articles of manufacture. In greater particularity, the present invention relates to printing images on the exterior of angled or axially symmetric media, including transparent and semi-transparent media, such as glass bottles. The invention also relates to the controlling of movement of media in and out of a printing area in a direct-to-media printer.

BACKGROUND OF THE INVENTION

Several techniques are utilized to print images on manufactured goods, such as drink and cosmetics containers. These containers are made of various materials, such as plastics, glass, metals, and coated paper. The traditional method for placing images on these containers, sometimes called "imaging," is to print a label on a plastic or paper substrate and then affix the pre-printed label onto the container exterior with adhesive. During the last 20 years many manufactures have transitioned from label printing to direct printing onto the container surface, sometime referred to as "direct-to-shape" (DTS) printing. However, while a label is a flexible medium and may be printed using traditional flexible sheet printing using methods going back over 100 years, direct printing on containers poses many challenges. One challenge is that while paper readily absorbs and retains inks and is a well understood medium for imaging, the containers themselves are made of materials that are difficult to image. Inks of special chemical blends and additives must be used, sometimes in the presence of active drying or hardening processes such as catalyst exposure or fast-curing using ultra-violet (UV) radiation. Further, container shapes are fixed, and an imaging process must take into account the irregular and varied shapes of the containers that are to be imaged. Such challenging print surfaces comprise a goodmany products, such as drink cans and bottles, home care products, cups, coffee tumblers, personal care items, automotive parts, sports equipment, medical products, and electronics containers to name just a few. Also, such products have varying optical properties, ranging from purely opaque to purely transparent. Hence, choosing the proper type of DTS printing equipment largely depends on the shape, size, number of colors, and type of substrate to be imaged, as well as the level of transparency of the product media and surface type onto which to transfer the image.

Various techniques have been developed to achieve DTS printing. One technique, "pad printing," allows the transfer of a two-dimensional image onto a three-dimensional surface through the use of a silicone pad, an ink cup, and an etched plate. Pad printing is ideal for difficult substrates such as products found in the medical field and promotional printing, but due to the expense of the process pad printing typically uses only 1 or 2 colors during a print job, thereby limiting the artistic expression available to three-dimensional surfaces.

Another technique screen printing utilizes a mesh or screen to transfer the ink to the substrate surface. The process requires creating a screen that selectively permits ink to flow through the screen using a blocking stencil. While a photographic process may be used to create the screen, and hence allows relatively good resolution of imaging, the process requires substantial set-up time and is less flexible because any update or small alteration to the image to be applied requires the creation of a new screen set which increases the time and expense for a screen process versus other DTS imaging processes. In addition, screen printing is typically restricted to only 1 or 2 colors because each color requires its own separate customized screen, thereby tending to limit artistic expression onto three-dimensional surfaces.

Due to the above limitations, inkjet printing has over time risen to be the preferred method for DTS printing, especially for package printing and printing on durable exterior surfaces, such as containers. Inkjet printing utilizes a digital printhead to print full color customized designs in one or multiple imaging passes and may be applied directly to the substrate surface of the object or medium. Developed in the 1970s, inkjet printers were created to reproduce a digital image directly onto a printing surface which is achieved by propelling droplets of ink directly onto a substrate medium. The ink delivery mechanism used to propel the droplets of ink is called the "printhead," and is controlled by a connected computer system that sends signals to the printhead based upon a digital image held by the computer system. Since the digital image may be altered an infinite number of times, replication and refinement of an image applied through the printhead is easily achieved.

However, the design of printheads in an inkjet system varies greatly increasing the complexity of creating a DTS printer. Each head is uniquely designed for its application, and a variety of digital printer designs are available to be used to print on various substrates. Hence, various factors drive the selection of an inkjet printing system to be utilized for a DTS project, such as the type of product substrate to be printed, the volume of products to be printed, and the required manufacturing speed for the imaging of any product traversing through a manufacturing line.

Irrespective of the complexity of designing an inkjet printing system to meet a particular DTS target object, the benefits of inkjet printing in DTS applications have driven a preference to use inkjet systems in product manufacturing lines. The reasons for this are numerous. For example, inkjet printing requires less set-up time and allows for faster print and cure times. Inkjet printing also is configurable to allow printing on multiple items at once, whereas other printing methods are often restricted to a single print instance for each object being printed. Moreover, print jobs do not require fixed setup time and costs, such as the generation of screens or the installation of plates, and therefore digital images may be easily and inexpensively refined to meet the particular surface characteristics of a three-dimensional object, thereby maximizing the artistic expression capabilities of the printing system.

One great advantage of inkjet printing is the ability to change or refine graphic images quickly, sometimes almost in real-time, to adjust printing results or to reconfigure the printing system for a different three-dimensional object.

Modern imaging software is template driven and allows for the importation of new or re-worked graphics instantly. Hence, the flexibility of image alteration on a job-by-job basis is a distinct advantage.

In addition, inkjet printers are flexible enough to be used for short and long printing production projects, thereby meeting various manufacturing demands. For example, a single machine may be used to prototype or provide a sample, low-volume job for a potential client, or that same machine may be used in the same facility to print thousands of articles in a day for high volume production run. Further, the same machine may use various types of inks to accommodate a myriad of three-dimensional object surface materials.

Finally, conveyor and assembly line capability allow the inkjet printing process to become highly automated which increases productivity and lowers labor costs. So-called "inline" printers can do such printing at incredibly fast production rates. Typically, the inkjet printhead remains stationary while the three-dimensional object surface is moved underneath the printhead to maximize material handling through-put rates. This type of inkjet system is ideal for barcoding and dating product packaging. Single-pass multi-color inkjet printers are similarly used to achieve higher quality imaging with more color options at slightly slower print speeds, but still at a high-rate of production.

One type of inkjet system is specialized to print on the surface of cylindrical containers and are called "digital cylindrical presses." For example, The INX Group Ltd. (aka "Inx Digital" and "JetINX") a division of Sakata INX offers a cylindrical printing solution under its CP100 and CP800 line of direct-to-shape (i.e. DTS) inkjet printing systems. These systems allow for the creation of an inkjet production line to print directly onto axially symmetrical objects. Other companies offer similar systems, such as Inkcups Now Corporation which offers its Helix line of DTS printers. These printers use a rotatable mandrel to hold an object and rotate the object next to an inkjet printhead as the printhead jets ink onto the surface of the cylindrical object. An image is captured for transfer onto an object and a printing "recipe" created, either created by the printing machine itself or created separately on personal computer and then imported into the printing machine. The "recipe" includes information necessary for the printing of the image onto an object and the recipe parameters are specific to each type of printer utilized. In these types of DTS systems, the raw, undecorated three-dimensional object is usually referred to simply as "media."

The CP100 machine is a good example of an industry standard cylindrical DTS printing system. The system is a stand-alone machine that performs non-contact printing of images on generally cylindrical objects, and in particularly hollow cylindrical objects or hollow partially cylindrical objects, for example, single piece cans and bottles and two-piece cans and bottles. Each cylindrical object is hand-loaded onto the machine and secured by vacuum on a mandrel to prevent slippage, which is part of a carriage assembly that functions to linearly positioning the object beneath at least one digitally controlled inkjet printhead. The object is rotated in front of the printhead while ink is deposited onto the object to produce a desired printed design on its surface. The ink is either partially or fully cured immediately after printing by exposing the ink to an energy-emitting means, such as a UV light emitter, positioned directly beneath the object. A carriage assembly is fixedly mounted to a linear slide actuator, which is in turn fixedly mounted to a mounting frame, whereby the carriage assembly is free to traverse along the linear slide actuator. The carriage linearly advances the object in a position adjacent to the inkjet printhead such that a first portion of the object may be printed if the object length is longer than the length of the printhead. The object is rotated while the computer-controlled printheads deposit ink from a supply of ink located above the object being printed upon. Simultaneously the UV light emitter either partially or completely cures the ink. The carriage then continues to advance the object further such that the entire length of the object surface is printed upon. As may be understood, the continuous advancement of the object by the printhead may not be necessary if the printhead is longer than the image desired to be printed on the object, but this is typically not the case and the object must be advanced along a straight path underneath the printhead. The image itself comprises a digital image that is imported from a separate imaging application and loaded into a software application that is used to create the object recipe to accommodate the physical specifications of the object. A profile is loaded through an operating system present on the machine and utilized to control motion of the object held by the carriage assembly along the linear slide. A print engine running on the machine controls the delivery of ink onto the object via the inkjet printhead as the object is moved past the printhead in a digitally controlled manner. The precise deposition or expression of the ink via the inkjet heads is dependent upon the object recipe which includes the specific amount and color of ink applied to the object as it traverses the printhead. The structure and operation of standard cylindrical DTS printing systems are fairly well understood in the printing industry and disclosed in representative U.S. Pat. Nos. 6,918,641B2 and 7,967,405B2.

One challenge facing such DTS printing systems is the application of images to the surfaces of clear media, such as transparent glass or plastic media, or even semi-transparent objects such as frosted or color tinted media. Typical DTS systems, such as the above referenced Helix line of DTS printers position UV pinning and curing lamps below a rotating object. However, for transparent or translucent media this poses a problem. Transparent and similarly optically transparent media tends to scatter UV light and often causes UV light to impinge upon the printheads of the inkjet system. The incident UV light often causes the instant hardening of the ink on the printhead nozzles. This can cause the total or partial fouling of the inkjet head requiring either removal and cleaning of the printhead, or more often the complete replacement of the printhead. This interferes with the production time of any print job causing significant delays as the inkjet head is replaced and then recalibrated. Moreover, partial fouling may cause the degradation of image quality applied to the surface of media which may not be discovered until much later in a production run of a high quantity of printed products, thereby causing the loss of time and costly ink required to reprint the media, or even causing the total loss of processed products which in most instances cannot be reprinted and must be discarded.

Some have tried to reposition inkjet printing heads or the curing lamps, such as horizontally positioned lamps relative to downwardly pointing inkjet printing heads, to avoid such fouling, but such designs limit the number of objects that may be printed simultaneously and also do not address the quality issue of printed images on clear media because such repositions do not provide a consistent and controlled dosage amount of UV light to be applied to images. This causes an uncertain and inconsistent application of UV light to the applied images and reduces the overall quality of the applied images resulting in a visually unattractive printing result for a consumer, or worse an inability of the image to adhere properly to the object once applied.

An additional problem with clear or transparent media is the inability to properly gauge the total amount of UV light that is being applied to the surface of each object during a printing process. Currently, 3D media or object printing is achieved by first applying a reduced amount of UV light to ink applied to the surface of an object, often referred to as "pinning" the ink to the surface, which causes a partial hardening of the ink so that it adheres to the object surface while the object is rotated. This also allows for different colors to be applied to the surface as successive layers of imaging colors are applied during rotation, thereby allowing for a full range of artistic expression onto the object surface. However, each ink and even each color of a particular ink is precisely formulated to harden when exposed to UV light, with each ink varying in the amount of hardening reaction responsive to the application of the UV light. In transparent object printing, UV light easily passes through and is reflected off the various curved surfaces in the object during the printing, pinning, and curing steps. The hardening of an image onto a surface resulting from UV light exposure is additive in nature, with each exposure step increasing the total amount of hardening of the ink during a printing process. If too little total UV light is applied to the surface of an object, an image may not exhibit acceptable visual quality or may not be retained once shipped to a consumer. If too much total UV light is applied, the printed image may also not be retained, and annoyingly exfoliates during use by a consumer. Hence, manufacturers have learned that a precise amount of UV light must be applied that varies with each printed design for each type of media being printed. In fact, the size and shape of each media must be accounted for in order for an acceptable and permanent image to be properly applied to the object.

Unfortunately, even if procedures are established to tailor the total amount of power that is necessary to optimally cure ink expressed onto the surface of three-dimensional objects, the reflective properties of clear media causes the final curing step to scatter UV radiation around the printing area, including the area where print heads are positioned during the application of ink to the media surface along with the partial curing or pinning of the image onto the exterior of the media. Hence, transparent media pose an acute problem during printing because a manufacture is unable to control the aberrant amount of UV light that impinges on the inkjet printing heads during a final cure process, thereby causing the above noted fouling of inkjet printing heads.

A further concern is that any DTS printer must be economical and relatively simple to operate. Some prior designs utilize a complex series of tunnels to print multiple media object simultaneously. While this is desirable for large, high manufacturing jobs, they often require complex material handling systems appurtenant to the printing system, thereby requiring skilled workers to maintain and operate such handling systems. However, a single human operator can with the sufficiently reliable and automated system self-load media in the DTS machine and rapidly off-load and reload such media. As long as such a machine is reliable, high print job throughput can be achieved approaching the productivity of a complex, multiple printing tunnel machine. However, such DTS machines must be consistent and reliable, such as avoiding the problems with print head fouling, so that the operator can maintain a rapid pace.

Therefore, what is needed is an economical method for DTS printing on axially symmetric 3D objects that can approximate the print job throughput of complex, multi-tunnel printing system, while safeguarding against breakdowns caused by print head fouling due to inadvertent UV exposure at the print nozzle site. Such a DTS process would also avoid costly delays in transparent media printing, while allowing a single operator to process a large number of axially symmetric 3D objects of varying sizes.

SUMMARY OF THE INVENTION

It is the object of the present invention to provide a method for printing single media on a DTS machine that can through a single human operator provide economic and competitive throughput speeds as compared to more complex DTS machines utilizing material handlers and multiple printing tunnels. The present method incorporates the repositioning of a print carriage and the ability to re-configure the positions of inkjet printheads in a bank of printheads. The printing carriage is tilted and raised, and includes use of an adaptable spindle so that varying geometries of print media may be printed upon. Further, the printing process includes precisely controlling media during curing so that inkjet printhead fouling is avoided for transparent and semi-transparent media, thereby allowing a wide range of object media to be processed in a high capacity manufacturing environment. The prints a single piece of media in a single printing event, but maintains a printing job throughput similar to machine having the capability to print media in parallel printing events. Media is loaded by a single operator in a designated media loading area and moved into a single printing tunnel. The operator adjusts the angle of the media relative to a reconfigurable array of ink-heads by entering settings into a human machine interface that causes the printer carriage to alter the height and angle of the media surface in preparation for printing.

Other features and objects and advantages of the present invention will become apparent from a reading of the following description as well as a study of the appended drawings.

BRIEF DESCRIPTION OF THE DRAWINGS

A method associated with a reconfigurable single media printer incorporating the features of the invention as depicted in the attached drawings which form a portion of the disclosure and wherein:

FIG. 23 is a diagrammatic view of a final cure step in the printing process of the decorating machine;

FIG. 24A is a further diagrammatic view of a portion of the final cure steps during printing;

FIG. 24B is a further diagrammatic view of a portion of the final cure steps providing an option to minimize UV radiation scattering within the printing portion of the decorating machine;

DESCRIPTION OF THE PREFERRED EMBODIMENTS

Figure 1:
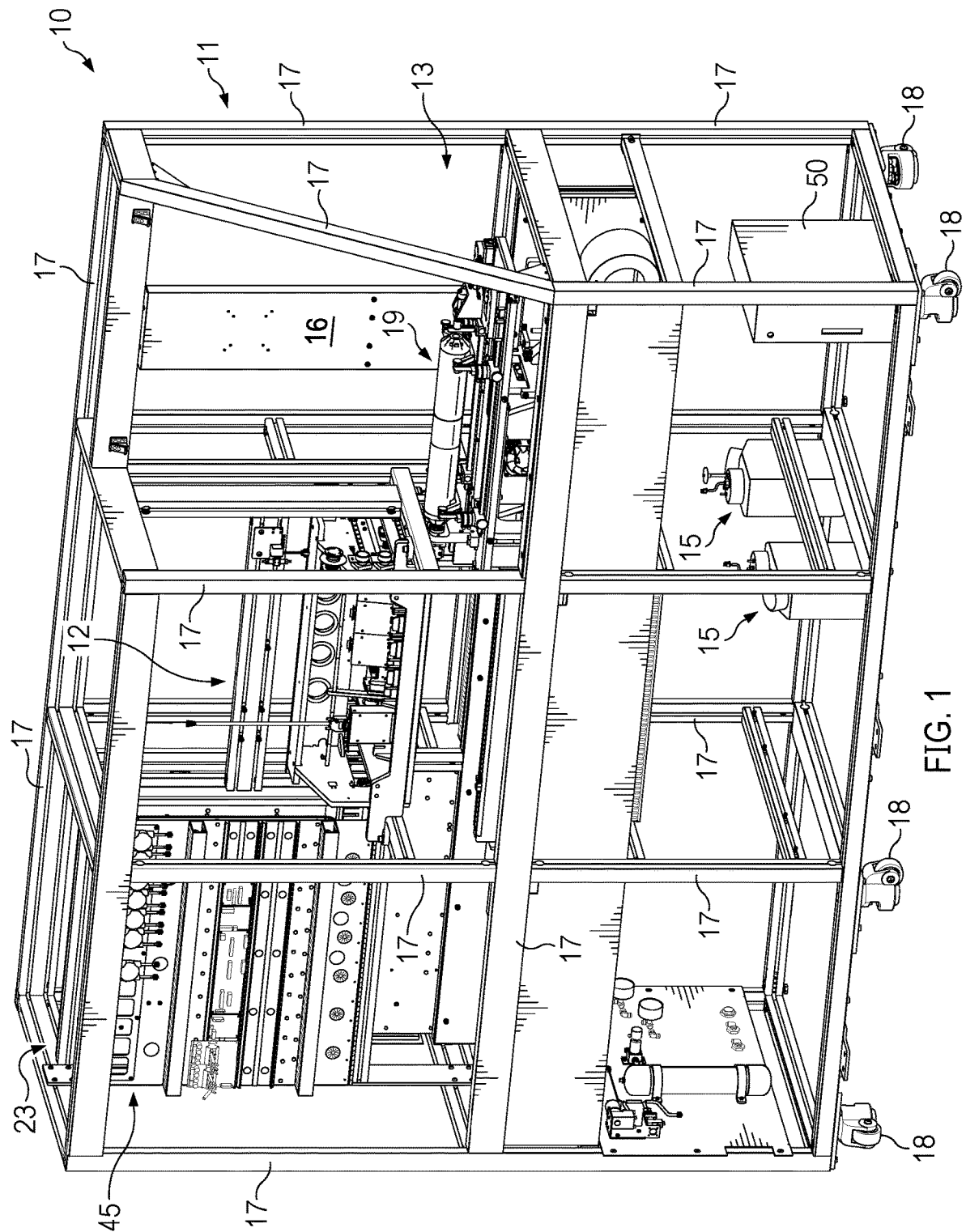
FIG. 1 is a front perspective view of the single media printer showing the major elements of the machine.
Figure 2:
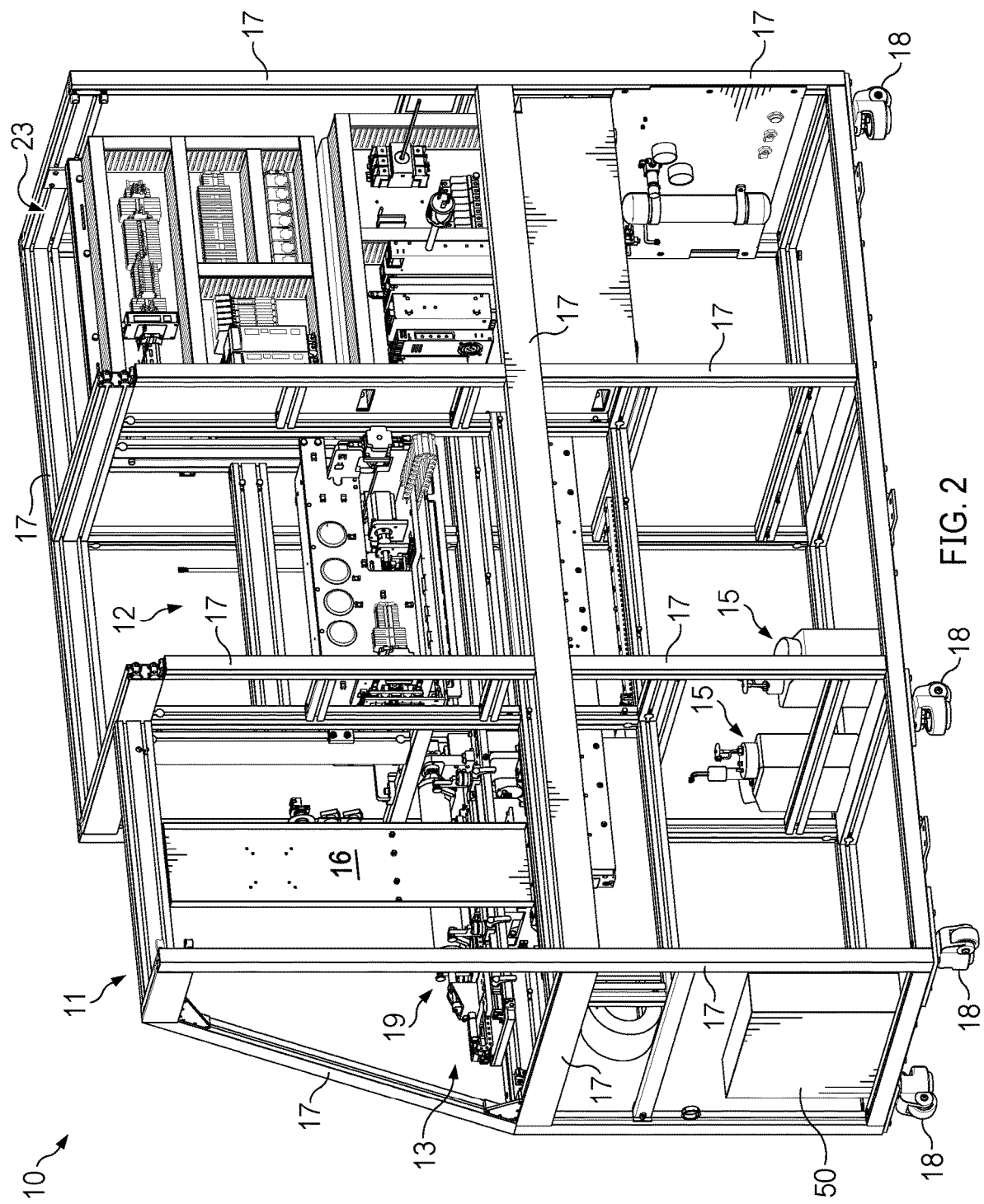
FIG. 2 is a rear perspective view of the single media printer.

Referring to the drawings for a better understanding of the function and structure of the invention, FIGS. 1 and 2 show perspective views of the decorating machine 10 showing the primary external components of the system. Machine 10 includes a media loading section 11 and a printing "tunnel" section 12. An operator (not shown) is positioned adjacent and in front (FIG. 1) of the media loading section 11 from which they may load an undecorated single piece of media 20 onto a loading shuttle 19 positioned in loading area 13 and adjust the operation of the system 10 through a human machine interface (HMI) via a display terminal (not shown) and keyboard 14 positioned above media loading area 13 within media loading section 11. Shuttle 19 serves a dual purpose of accepting and holding various shapes and sizes of media in an adjustable manner thereby forming a "printing carriage" for moving the loaded media 20 from loading area 13 into printing tunnel 25 for printing. A rear support panel 16 supports the display terminal and keyboard 14 conveniently located above the printing carriage 19 (see FIG. 5). Carriage 19 is supported by a pair of rails 22 and includes media support assemblies that are sized to support a variety of sizes of media 20 in a horizontal orientation (see FIG. 5). For the purposes of the present system, the targeted type of undecorated media is an axially symmetrical 3D object, including cylindrical objects that may be transparent (i.e. visually clear) or semi-transparent (e.g. translucent, frosted or colored glass containers) 3D objects. Typical types of 3D axially symmetric objects include wine bottles, tumbler containers, and water bottles.

Machine 10 includes various support frames 17, external panels (not shown), and support rollers 18 which allow for easy relocation of the machine, and provide cover for the machine 10 to allow for environmental isolation and safety for operators. For illustration purposes, the machine is shown in the figures without its external panels so that the internal components may be easily seen and described, however the machine 10 is typically configured to include external panels on all sides except for the loading area 13 which optionally may include a raisable clear cover (not shown). Most panels are hinged or detachable to allow free access to storage areas of, for example, printer ink supplies such as large volume ink reservoirs, for access to perform maintenance on internal components, and for access to cable conduit distribution wires that provide internal electrical communications and supply power to various areas within machine 10. The various distribution cables are not shown in the figures, but are well understood in the industry and not necessary for an understanding of the structure and operation of the printer 10.

System 10 incorporates several commercially available subsystems to make system 10 operative. For example, system 10 includes an ink delivery system manufactured by INX Group Ltd. (aka JetINX) that includes a system of pumps, electronic controls (i.e. a print engine), and a tubing system to transport inks of various colors from reservoirs inside a user accessible lower portion in the rear of the system 10 to a plurality of ink tanks 15 and thereafter to a bank of inkjet print heads, as will be further described. Printer 10 includes lower portions in each enclosure sections 11, 12, 23, that hold various printer support subsystems as shown. For example, the lower portion of section 11 houses a standard personal computer or PC 50 that is connected through cables with a display terminal (not shown) held by a display terminal support panel 16 for control of the system 10 via an HMI used by the operator. A suitable PC for system 10 is a 2.9 GHz Intel Core i7, with 64 GB RAM and an Intel UHD graphics processor 630, and running Windows 10 (HP part No. 2X3K4UT #ABA). The printer 10 includes an ink delivery subsystem connected and controlled by the personal computer 50 for delivering ink to a series of inkjet printer heads within printer image deposition and curing area 25. A suitable print engine and ink recirculation system for system 10 is available from INX International Ink Co. under part Nos. 99-14080 (Head Drive Mother Board) and 99-14081 (Gen 4 Printhead Control Board) as part of their JetINX™ printhead drive electronics component and ink delivery system offerings. As will be further discussed, printing tunnel 25 is sized to allow the passage of a piece of media 20 underneath within section 12 and includes a plurality of inkjet heads and UV lamps that are positioned within close proximity to the surface of each piece of media 20 once positioned within each tunnel 25. Suitable printheads for printer area 25 are the Gen 4 Print Heads offered by Ricoh Company, Ltd. under part No. N220792N. Suitable UV lamps for both final curing and ink pinning are available from Phoseon Technology under its FireEdge FE400 LED curing line of products (Part No. FE400 80X10 8W). The INX print engine includes its own human machine interface (HMI) that runs on a standard Windows based PC 50 and that controls the operation of the print engine. Some variations of the INX HMI include the capability to vary ink pressures delivered to each inkjet head by sending messages to the INX HMI through a dynamic linked library (.DLL) file loaded onto the PC. In the preferred embodiment of the herein described printing system 10, a second HMI (referred to herein as the "LSINC HMI") overlays the INX HMI to extend the interface capabilities of the INX HMI such that the herein described system may utilize the INX supplied sub-systems. In particular, the LSINC HMI responsive to a supplied media object geometry file converts media geometries into a form usable by a motion control subsystem and uses those geometries to transfer ink pressure changes to the INX HMI to adjust for environmental conditions, as will be further discussed. Further, as is known in the industry, inks are selected specifically to bond with and adhere to the surface of various types of media object surfaces in order to accommodate the graphical color requirements of each graphic design used in a print job. The complexities of selecting inks and color coordination to achieve a particular graphic design goal, and the elements for and the operation of the purchased INX ink delivery system will be omitted in as much as such information is understood in the industry and not necessary for a complete understanding of the herein described invention.

Figure 3:
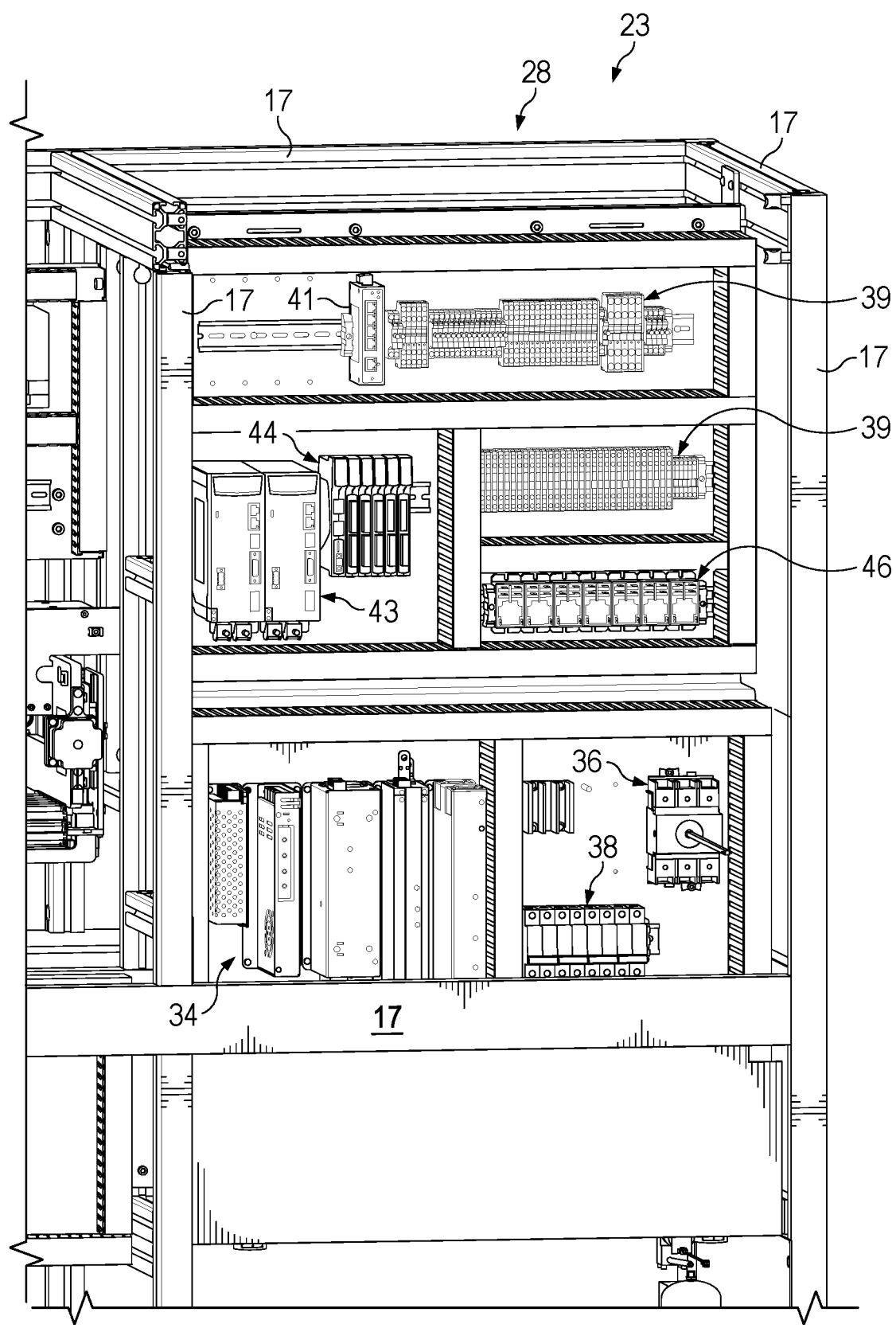
FIG. 3 is a magnified rear perspective view of the electronics bay portion of the single media printer.
Figure 4:
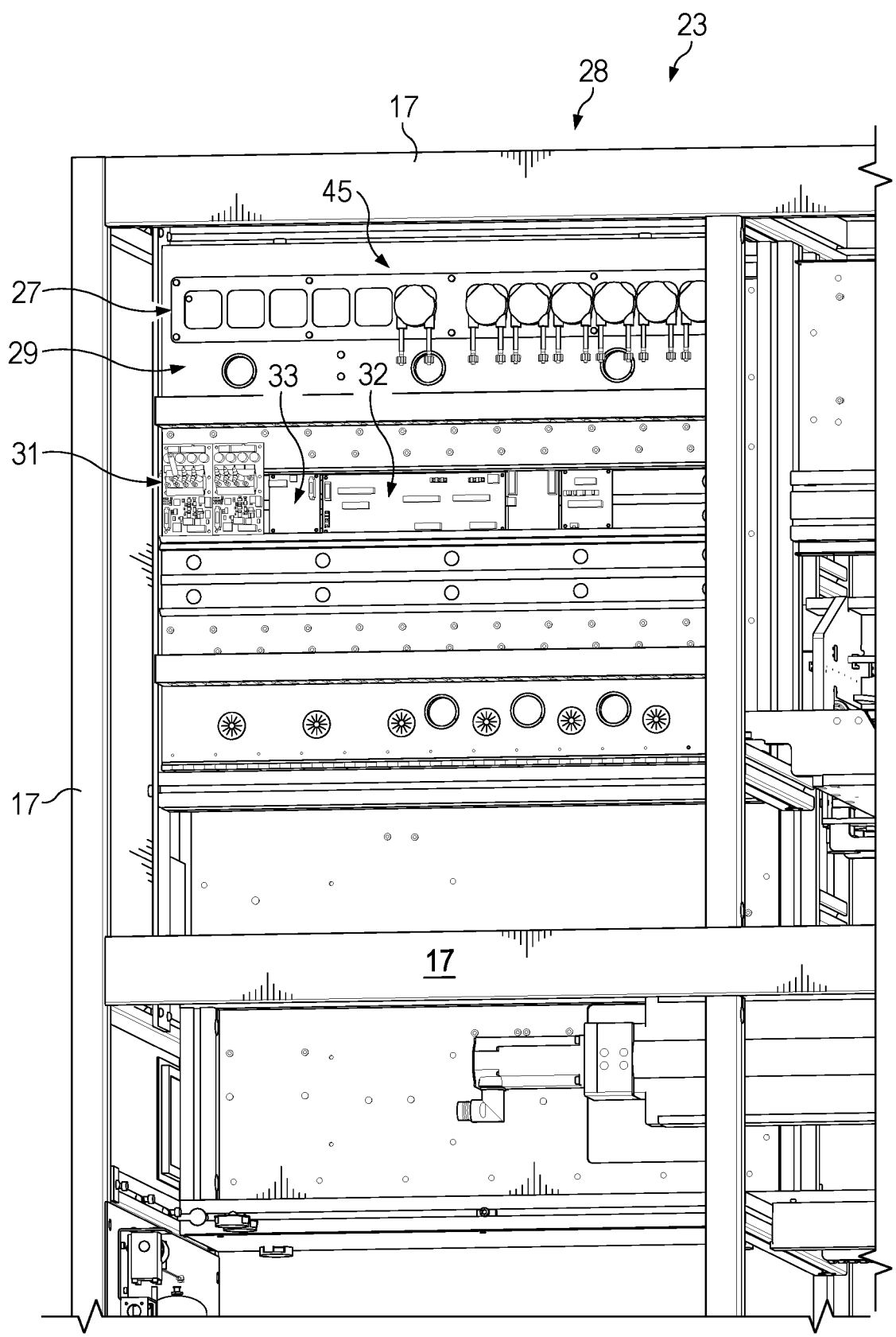
FIG. 4 is a magnified front perspective view of the electronics bay portion and the printing tunnel area of the single media printer.

FIGS. 3-4 show the machine internal electronics bay and ink components supported within enclosure area 23 by frame components 17 to the left of the printing tunnel section 12. The enclosure area 23 supports an ink delivery system 45, including a collection of peristaltic pumps in a single assembly 27 held by a sheet metal panel 29 supported above an electronics bay 28, and holds various electronics and printed circuit boards (PCBs) for controlling the machine and printing process. Ink pressure control board 31 controls the flow of ink from pumps 27 to inkjet printing heads in the machine. An input-output board 32 consolidates input and output signaling within the machine 10 and is electrically connected to USB controller board 33. The upper rear side of enclosure 23 holds a plurality of power supplies 34, a power input quick disconnect, connection port 36, and a circuit breaker panel 38. Above these items appears a pair of terminal blocks 39, an internal ethernet switch 41, a relay panel 46, and a servo driver board 43. A programmable controller board 44 issues control signals to coordinate media movement, ink pressure for ink expression, and printing and curing elements of the machine 10, as will be further discussed.

Figure 5:
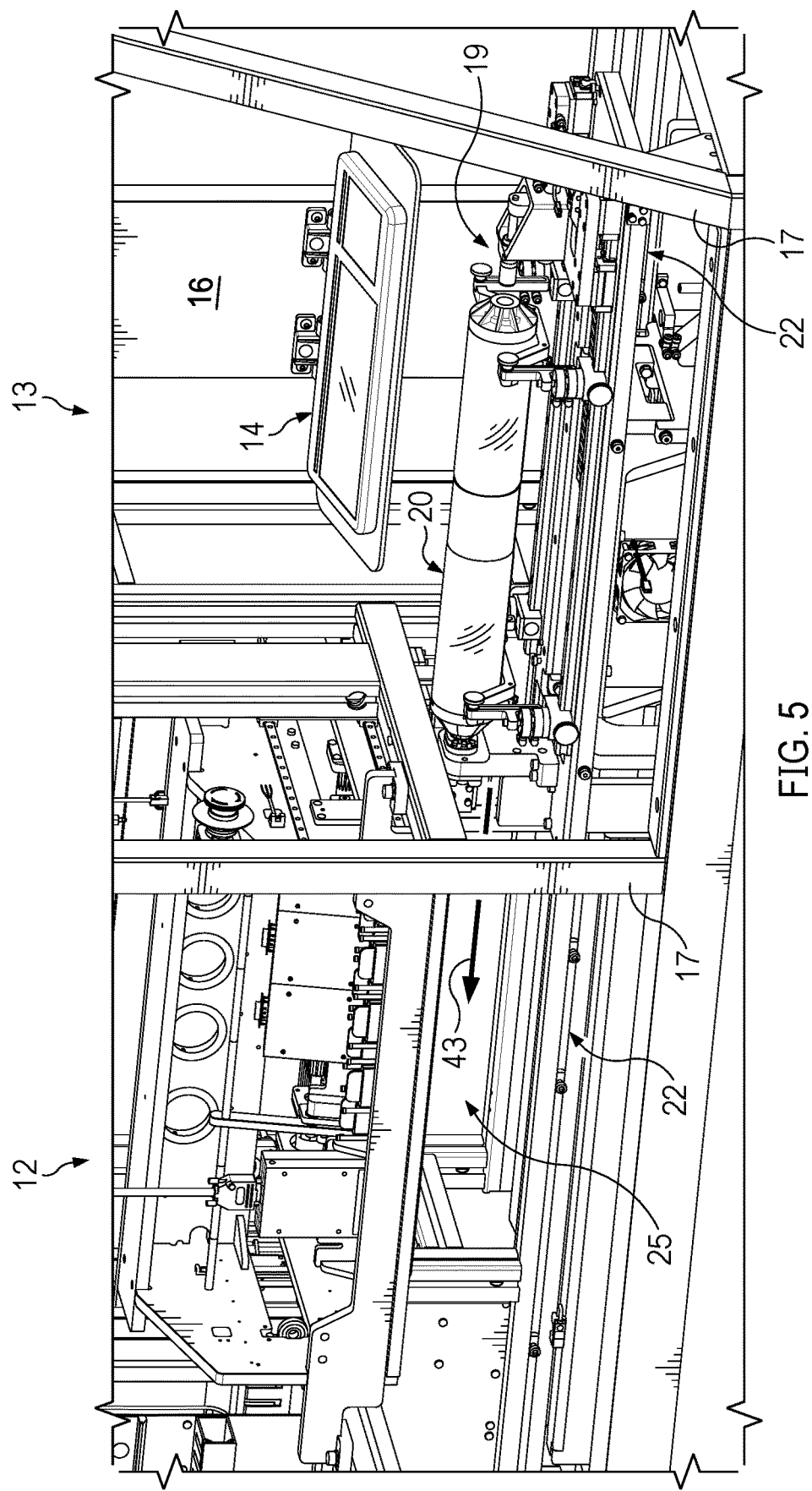
FIG. 5 is a magnified view of the media loading area and printing tunnel area of the single media printer.
Figure 6:
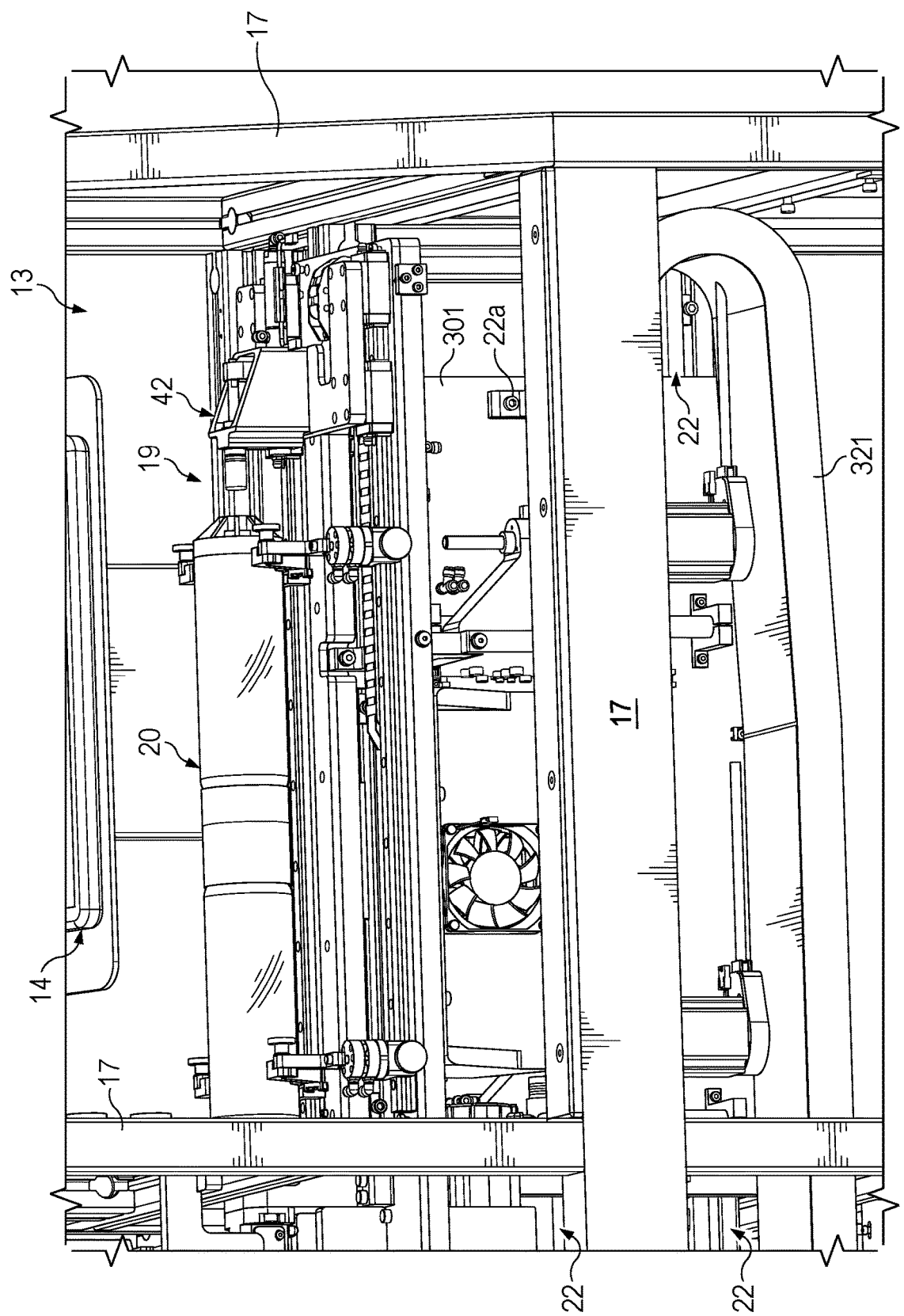
FIG. 6 is a magnified perspective view of the media loading area of the single media printer.

Referring to FIG. 5-6, it may be seen that an undecorated piece of media 20 is loaded onto carriage 19 by the operator working in the loading area 13. Carriage 19 is supported by a vertically oriented plate 301 (see FIGS. 10-11) that slides on a pair of horizontal rails 22 formed in horizontal machine frame portions 17 spanning the lower portions of section 12 and 13. The rails 22 are mated to support screws 22a affixed to the rear surface of plate 301, and are sized and positioned to support the weight of a piece of media and media support and positioning elements held by plate 301. Rails 22 continuously run from loading area 13 into tunnel area 25 to permit printer carriage 19 to traverse freely from within the loading area 13 to printer tunnel 25 along path 43. Movement from the loading area 13 to the printing area 25 is accomplished by either an operator moving the loaded carriage 19 into tunnel 25 to a printing tunnel starting point, or automatically through axial advancement of a rotating screw (not shown) that moves the carriage along path 43. Once moved into position, printing occurs on each piece of undecorated media 20 within tunnel 25 under the precise direction of a unique print control profile held in computer memory specific to the shape and size of each piece of media.

Printer 10 includes electronics so that as printing carriage 19 is moved along path 43 within tunnel 25, along with a loaded piece of media, the media is rotated and the surface of the media is moved axially under each printhead in a coordinated fashion. As a piece of media traverses under a print head the axial movement of the printing carriage 19 and rotation speed of the media 20 is precisely controlled via spindles 42(a,b) supporting each end of the media 20, and a drive motor causes movement of printing carriage 19 via a screw shaft (not shown). In addition to being rotationally controllable, spindles 42(a,b) are self-stripping and are locked against the ends of each piece of media via air cylinders at one end 42b, but having a spring-loaded configuration thereby clamping each piece of media within the print carriage 19 at the central rotation axis (107 of FIG. 12) of each individual piece of media.

Except for vertical and angled manipulation, as will be discussed, a suitable media carriage arrangement may be found in U.S. patent application Ser. No. 16/796,644 (now issued as U.S. Pat. No. [ ]), at Pg. 13, line 11 through Pg. 15, line 2; and FIGS. 5-6 (commonly owned by the Applicant), all of which is hereby incorporated by reference.

Figure 7:
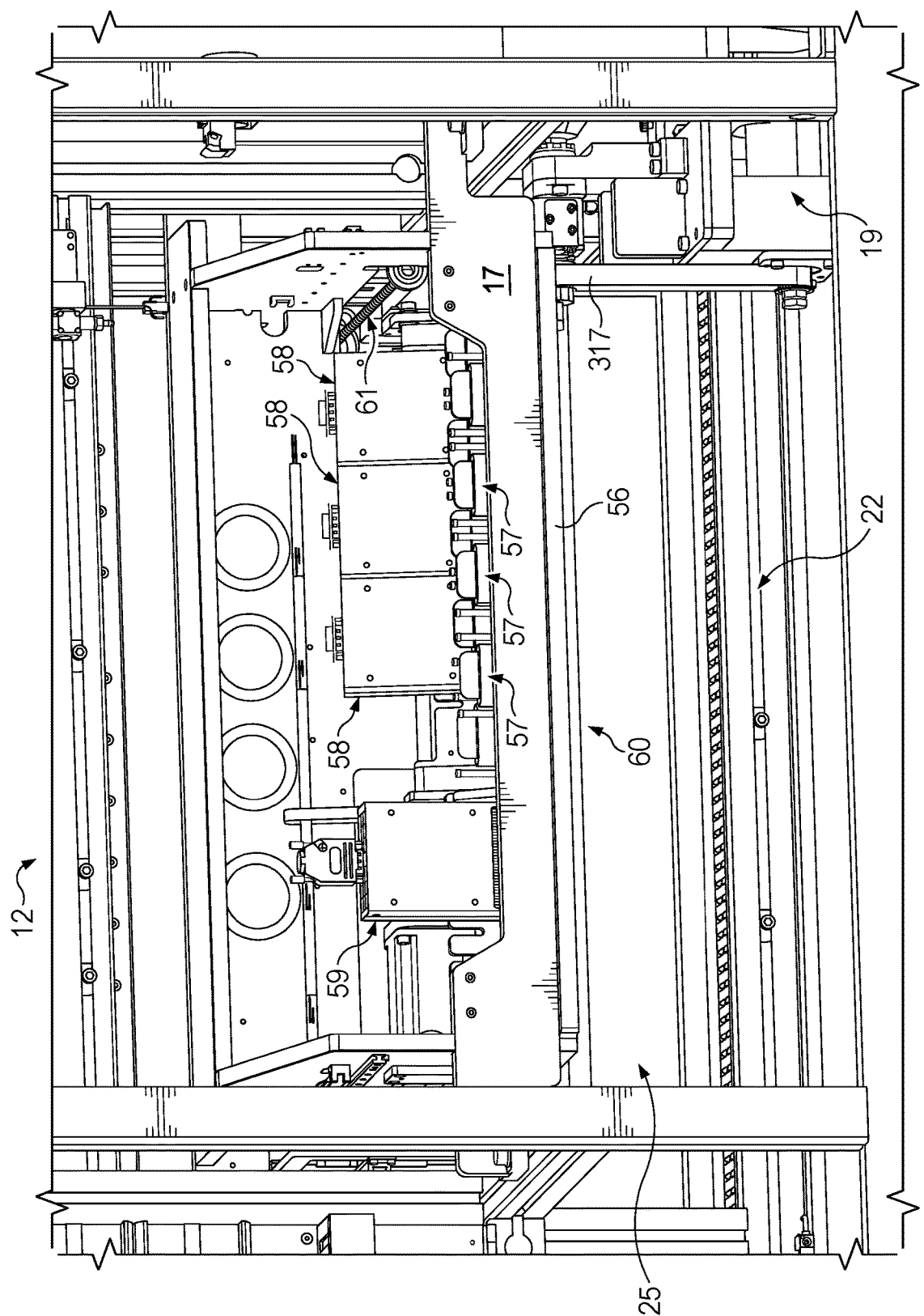
FIG. 7 is a magnified perspective view of the tunnel printing area of the single media printer.
Figure 8:
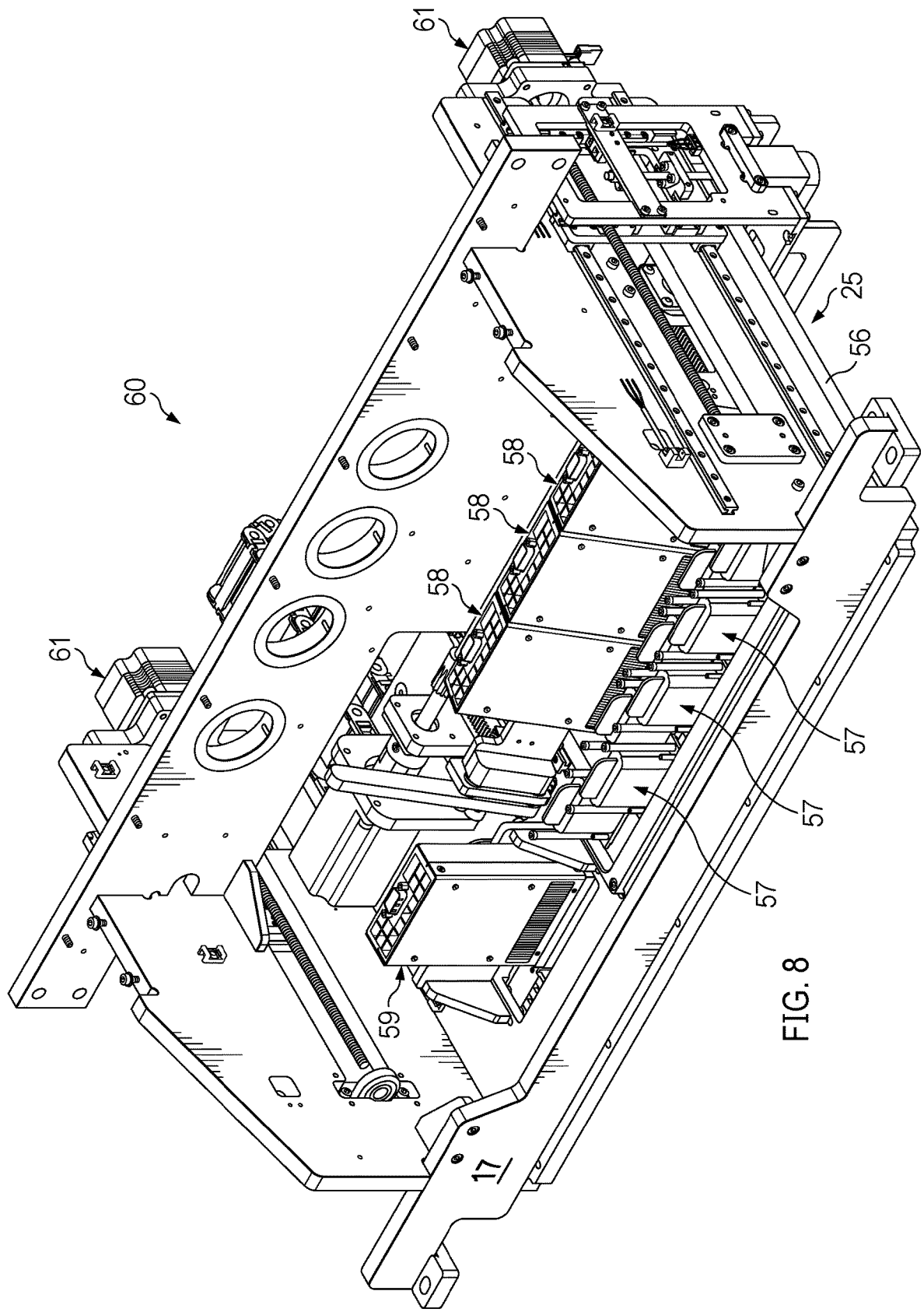
FIG. 8 is an isolated perspective view of the printing head-plate holding print heads and curing lamp elements of the single media printer.
Figure 9:
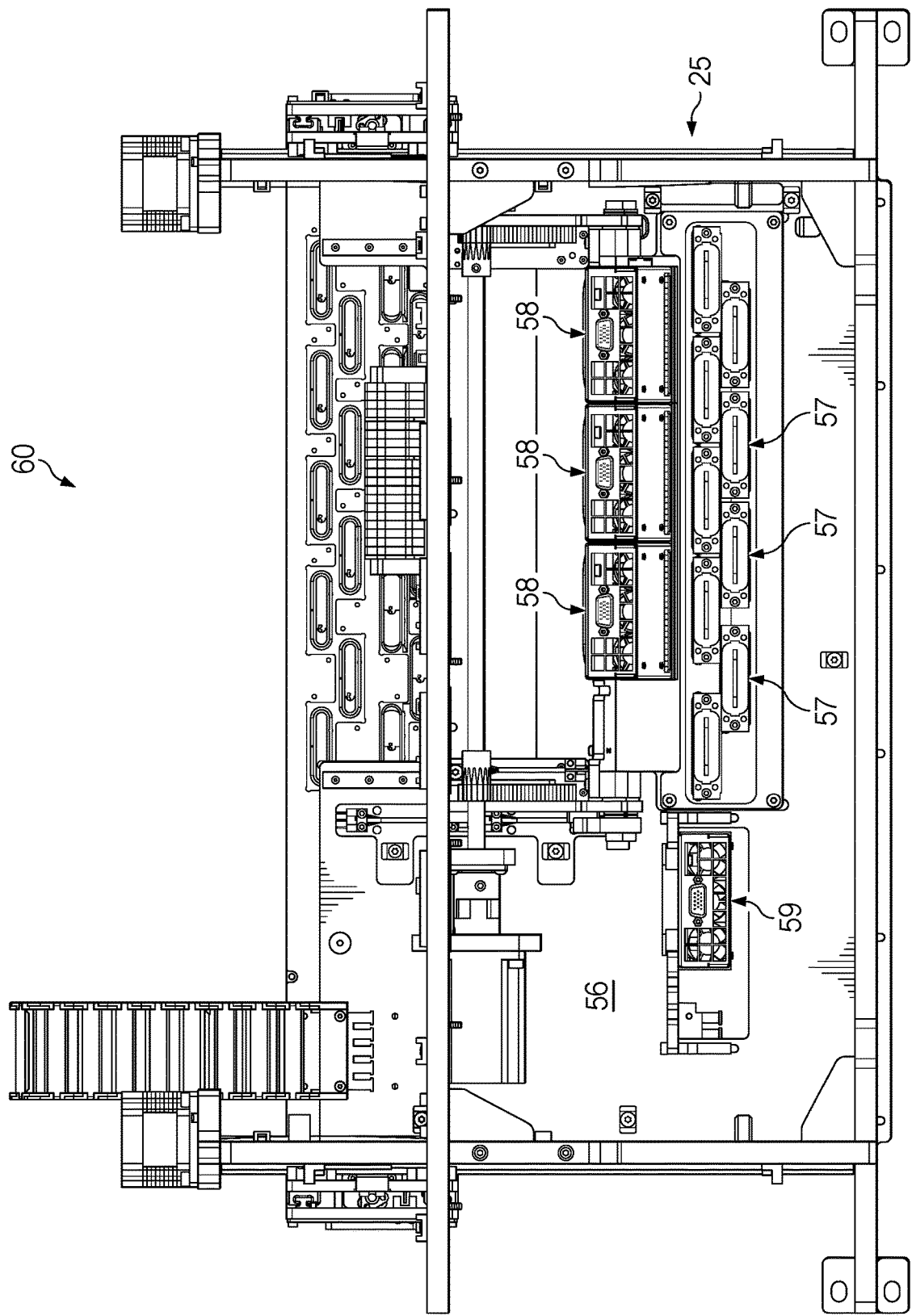
FIG. 9 is a top plan view of the printing head-plate holding print heads and curing lamp elements of the single media printer.

FIGS. 7-9 show the tunnel area 25 above which a printhead and cure lamp support assembly 60 is positioned within print section 12. The assembly 60 includes a support plate 56, positioned to allow for adjustment of the relative positions of the printheads and cure lamps so that various sizes of media may be accommodated by the printer 10. The support assembly 60 includes a plurality of elements that are able to be tilted via connected motorized racks as well as move laterally relative to the rotational axis (107) of each media piece. An operator enters via a human machine interface (HMI) geometries for the media piece to be utilized in a printing job, such as for example the length, diameter, and offset spacing of the surface of the media piece from the print heads, and a PC actuates movement of the elements on support plate 56 and motorized racks 61 to accommodate the media size. A suitable mechanical arrangement to accomplish the above described positioning system of assembly 60 may be found in U.S. Pat. No. 11,396,191B1, at Col. 9, line 4 through Col. 10, line 28, and FIGS. 7A-7F (commonly owned by the Applicant), all of which is hereby incorporated by reference. The current design differs from the suitable design described in U.S. Pat. No. 11,396,191B1 in that the present support plate 56 does not raise and lower to accommodate various diameter sizes of media, but instead adjusts the position of the printer carriage 19 to maintain a suitable distance between the media surface 21 and the inkjet printing nozzles. The other positional elements of inkjet print heads, partial curing lamps, and final cure lamp(s) are altered in the same manner as described in U.S. Pat. No. 11,396,191B1.

Importantly, the described selectable positioning of UV lamps 58 in relation to the position of the media 20 and printheads 57 minimizes the potential for UV exposure to each printhead, either directly or via transparent media reflections. As may also be noticed, the final cure UV lamp 59 is positioned behind the bank of inkjet printing heads 57, and the UV pinning lamps 58 are positioned adjacent to the bank of printheads 57 and pointed downward and away from the bottom of the inkjet print head nozzles (i.e. each downward pointing printhead nozzle). Further information regarding the avoidance of reflections during printing and the positioning of the printing and curing elements shall be discussed below.

Inkjet printing heads 57 are supported above printing area 25, and a linear grouping of ink curing lamps 58 are positioned along a lower portion of printing area 25 for partial curing of inked images. As shown in FIG. 4, the series of peristaltic pumps 27 and the above referenced electronics PCBs control the pressure of ink flowing from each pump in 27 to inkjet printing heads 57 from the ink tanks 15 in lower cabinet portion of section 12. A final cure lamp 59 cures ink deposited onto the surface of the media 20 to a final cured state.

For the purposes of discussions on the operation of the herein described printing and partial ink curing and final curing steps, a suitable ink delivery and print engine sub-system 45 may be found in U.S. Pat. No. 10,710,378B, at Col. 6, lines 12-47; Col. 7, lines 6-12; Col. 12, line 33 through Col. 13, line 26; and FIG. 4 (commonly owned by the Applicant), all of which is hereby incorporated by reference.

Figure 10:
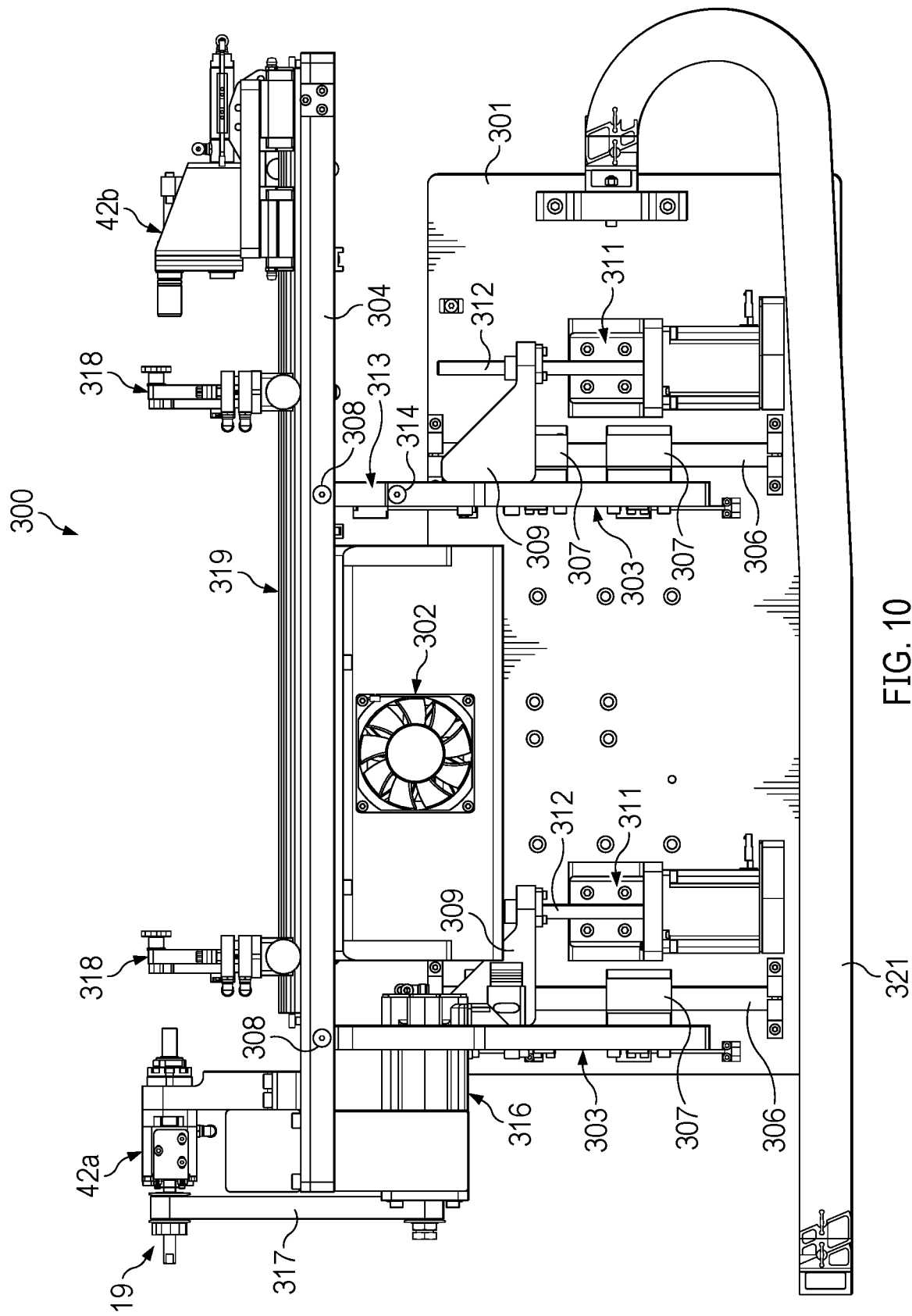
FIG. 10 is a front elevational view of the media holding means without media loaded.
Figure 11:
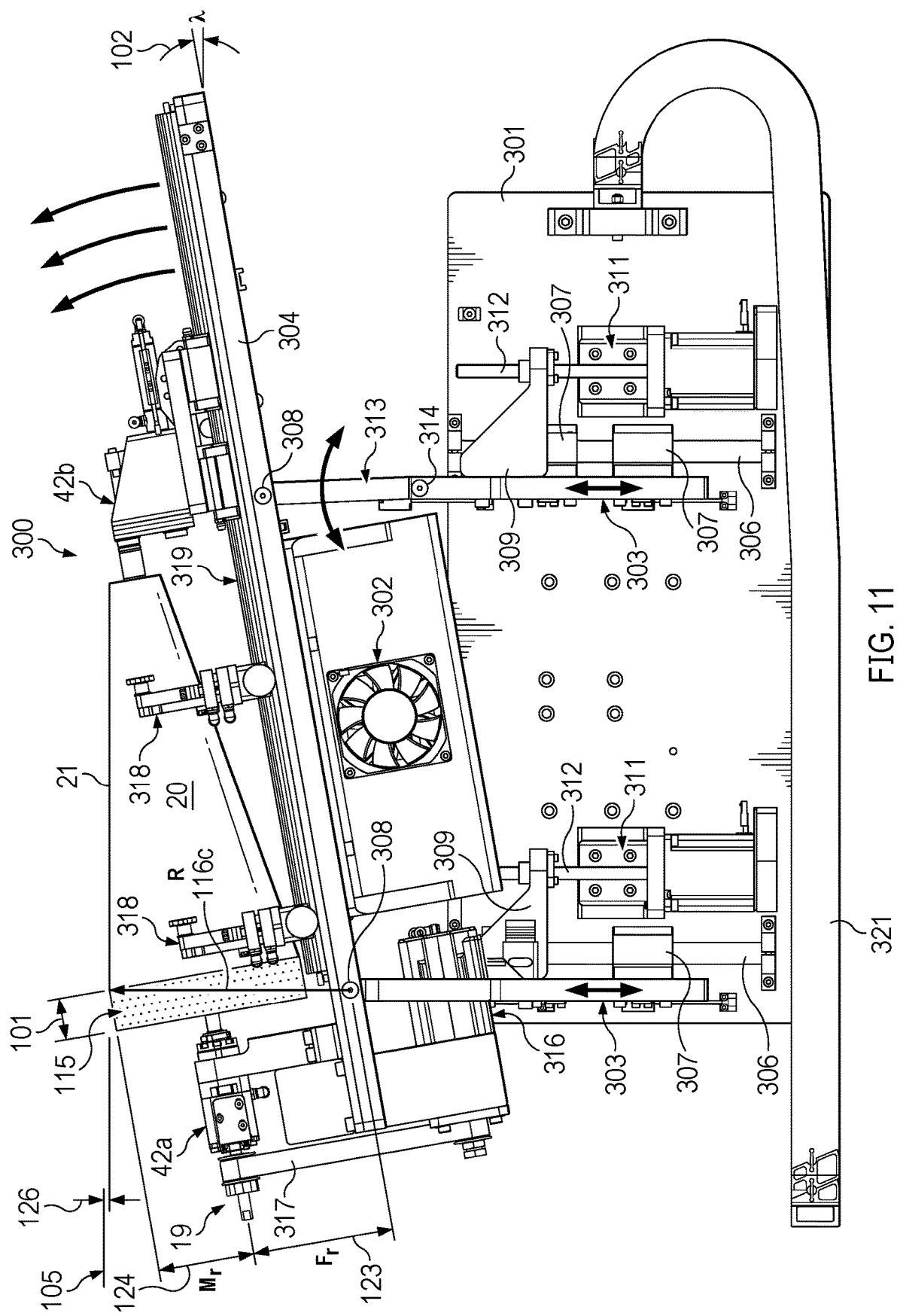
FIG. 11 is a front elevational view of the media holding means loaded with media and oriented into a tilted position.
Figure 12:
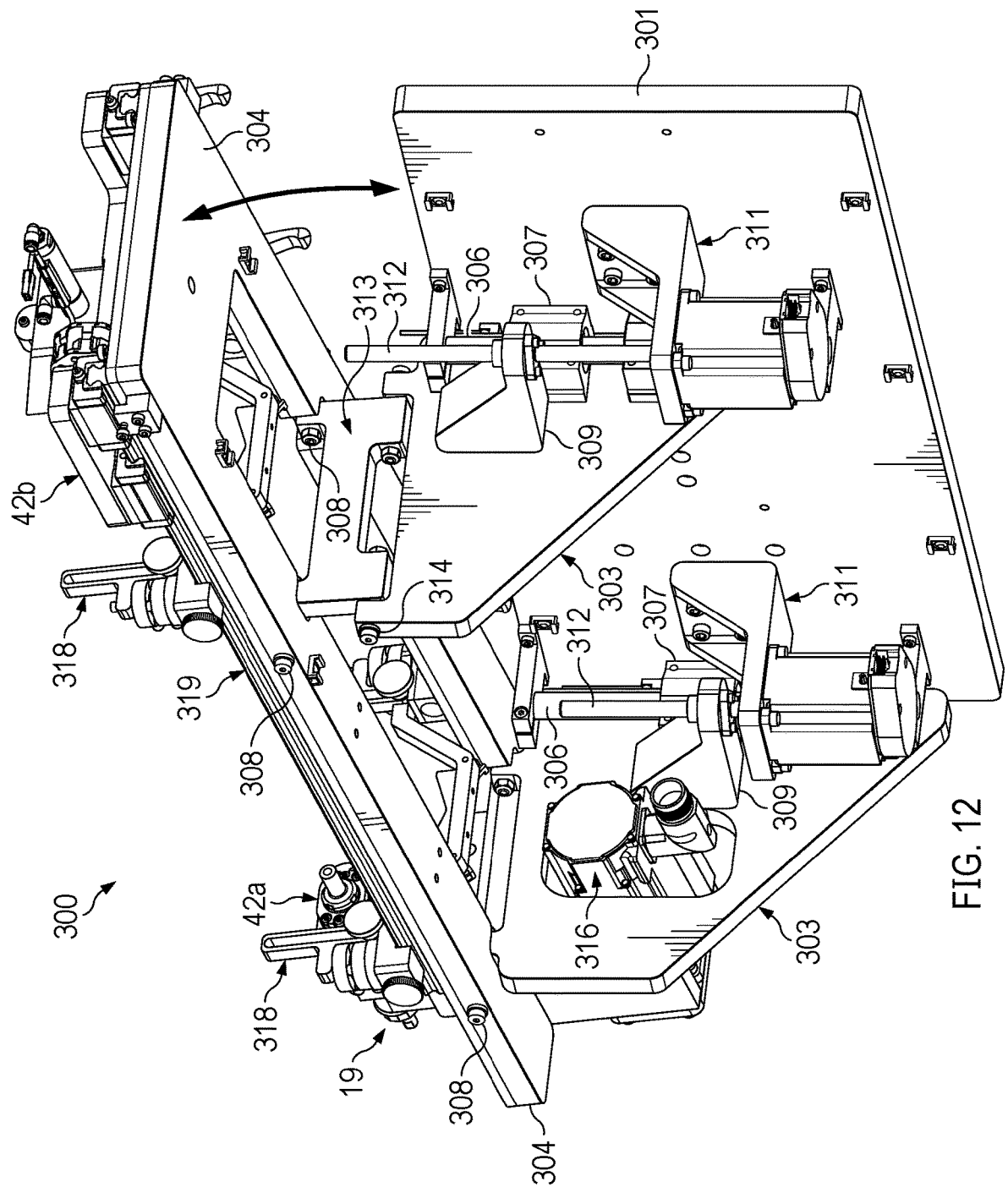
FIG. 12 is a perspective view of the media holding means without media and oriented into a slightly tilted position.

Referring now to FIGS. 10, 11, and 12 it may be seen the coordinated movement of the media print carriage 19 to move media laterally along path 43 under printheads 57 and partial curing lamps 58 as well as, if required, raising and tilting media 20 so that the surface of media 20 is maintained within sufficient proximity to printhead nozzles positioned on the lower surface of each print head to properly express ink onto the surface of media 20 and to reproduce images onto the surface of the media. This zone of optimal jetting ink expression is herein referred to as the "jetting distance" or "jetting zone" between the inkjet head nozzle and the surface of the media 21. Importantly, headplate assembly 60 is vertically stationary relative to the frame elements 17 of the printer 10, but media holder 19 may be elevationally and angularly adjusted relative to the headplate so that various shapes and sizes of axially symmetric media may be processed in the printing tunnel 25. A vertically oriented support plate 301 holds various media positioning elements and is slidable from loading area 13 into printing tunnel area 25 along path 43. Support plate 301 is slidably supported by a pair of rails 22 so that plate 301 may be moved along path 43 while holding a piece of media 20, even while media 20 is rotating. Once moved from the media loading area 13 into the printing tunnel area 25, the media carriage 19 is manipulated so that media 20 is optimally positioned adjacent to the inkjet print heads 57 within printing tunnel 25 in preparation for printing on the exterior of media 20.

To achieve repositioning of the media 20 on the printer carriage 19, support plate 301 includes a pair of vertical supports 303 that rotationally connect and support a horizontal support plate 304 to vertical support plate 301 at bolt pivot points 308. Each vertical support 303 is supported by at least one guide 307 surrounding a pair of vertical rods 306 mounted to plate 301. Each vertical support 303 is also supported by a movable guide plate 309 that surrounds at a distal end a solenoid shaft 312 movable via solenoid body 311 which is mounted onto vertical plate 301. Right most support 303 further includes an upper hinged portion 313 that is pivotable around rotatable bolt 314 to allow partial pivoting of upper portion 313 when right most support 303 is differentially raised. As may be seen, when solenoids 311 are controllably energized, shafts 312 raise or lower brackets 309 concurrently that consequently raises and lower support plate 304. Conversely, right most solenoid 311 may be raised and lowered differentially (see FIG. 11) so that as upper portion 313 tilts around bolt pivot point 314 responsively as right most shaft 312 is raised upwards. This allows for the selective differential raising and lowering of media 20 so that when the shape of media 20 consists of axially symmetric shaped portions the angle and height of the media may be adjusted so that the exterior surface of media 20 may be continually presented as a flat horizontal surface underneath the inkjet print heads. As shown in FIG. 11, by differentially adjusting the height of support brackets 303, the exterior surface 21 of media 20 may be maintained horizontally and, consequently, spaced from inkjet head nozzles at a preferred, optimal jetting distance. The arrangement also includes an articulated cable 321 to permit electrical control signals to pass to and from inkjet printer print engine held in electronics bay 23 while the media holder 19 is moving, and a fan 302 is included to force air underneath and through the media holder to prevent excess ink mist from condensing on the various carriage elements by pulling excess ink mist into a mist collection system (not shown).

Media holding means 42 is rotationally connected to a motor 316 mounted to the underside of support plate 304 via drive belt 317 so that media 20 is controllably rotated as is traverses along path 43 in print tunnel 25 during printing. In addition to the media spindles 42a,b, media support guides 318 temporarily support media 20 in order for an attached a spindle fixture to be affixed to media end and to align the spindles 42a,b with the axis of rotation for the media (see FIG. 13, 107) as motor 316 rotates the media, and the supports are adjustable along rails 319 formed in the surface of plate 304 to optimally support an inserted particular media shape.

Referring now specifically to FIG. 12, it may be seen the manner in which the print carriage is constructed in order to increase stability of the carriage 19 during movement. During printing, movement of the carriage 19 and the media 20, and especially movement of eccentric media, causes vibrations that can rock the carriage 19 back and forth and can detrimentally affect printing quality. To prevent this, vertical members 303 are constrained to the vertical support plate 301 through the parallel linear solenoids 311 and other connected fixed parts, and members 303 and 313 are constructed of relatively robust and rigid material as shown. The parallel arrangement eliminates play between the horizontal support plate 304 and the linear actuators 311 during carriage movement. Further, the vertical supports 303 are pinned together in two locations 308 and 314 with horizontal base plate 304. Having the carriage pinned in two locations adds increased stability and rigidity to the system, and the dual pinned locations also eliminates extra play at the pivot points 308, 314. The described arrangement creates a movable truss structure that maintains the line of the head and tail stocks 42a,b during printing, even when subjected to vibrations generated by the rotation of eccentric media during printing.

Figure 13:
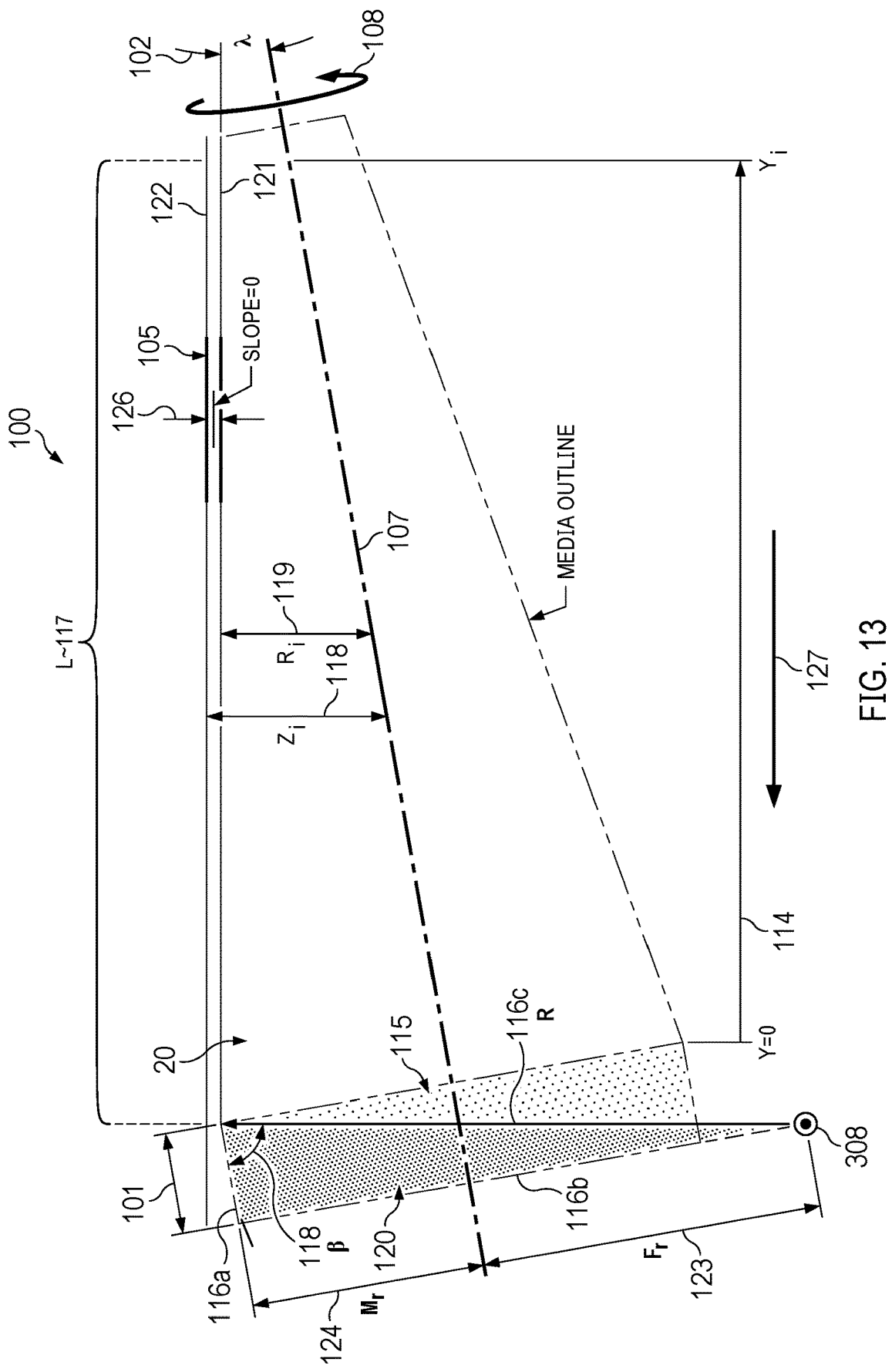
FIG. 13 is a diagram showing the media holding means positioning parameters relative to the print head plate in order to orient the media for printing.

Referring now to FIGS. 11-13, it may be seen the manner and movement 100 of the print carriage 19 so that the surface of media object 20 conforms to the stationary position of ink heads 57 so that a proper jetting distance is maintained as the media rotates 108 and advances within printing area 25. Initially, a worker enters geometric information representative of the media 20 into fields presented by the LSINC HMI. Those geometric values include the maximum diameter of the media, which is twice the radius of the media at the left most position of a printable image on the exterior of the media (i.e. the first portion of an image to be printed as it passes under the first inkjet print head nozzle) 124, and the angle λ 102 of the axis of rotation of the media relative to the inkjet print head nozzle which is an equivalent tilt angle of the horizontal plane created by the plate 304 (λ 102 in FIG. 11). The height of the media 116$b$ is also calculated to specify the print gap or jetting distance 126 that the media surface should be spaced from the lower surface of the inkjet printhead nozzle (i.e. the jetting distance), and a fixture offset distance entered to indicate the distance from the spindle shaft to the leftmost beginning of the media 101. This information is entered as part of profile setup for a particular media 20 to be printed upon, which may be recalled for use in the future whenever that media is again processed in the printer. Once entered, the profile information is processed by the printer to create a unique print "recipe" associated with the processed media, that includes additional information such as the required rotation speed of the media during printing, where to apply ink on the media surface, the specified jetting distance, and UV lamp positions and exposure times, as will be further discussed.

As shown media object 20 includes an axially symmetric surface area that varies by radius $R_i$ 119 from central axis 107 of object 20, thereby creating a print path 122 having a print length of L 117 along the path 122 which is parallel to target media surface 121, but spaced away from surface 121 by a small amount representing the jetting space or jetting "offset" 126 (i.e. jetting zone) between an ink print head 57 lower nozzle surface 105 and object surface 121. This distance is small, typically 0.80 mm to 1.0 mm, and is the distance that ink droplets must traverse prior to landing on object surface 121 to create an image. The contemplated media for the present printer is an axially symmetrical object having a constant sloped surface. An example of such an object is shown in the figures with an indicated media outline. Spindle 42$a$ includes a fixture portion 115 (shaded rectangle) that is matched to an end of the media 20 as shown and has a fixture offset width 101 separating the media end from the spindle 42$a$. Rotation axis 107 is axially concentric with the axis of rotation of spindle 42$a$, thereby forming a media radius $M_r$ 124 (i.e. half of the media diameter), and also a fixture radius distance $F_r$ 123 between the axis 107 and pivot point 308. These geometric features form a right triangle area 120 (shaded area) with a hypotenuse 116$c$, and legs 116$a$ and 116$b$. This also forms an angle β 118 between the hypotenuse 116$c$ and leg 116$a$. The leg 116$c$ is equivalent to the distance R between pivot point 308 and the intersection of the top-right corner of rectangle 115 and the leftmost contact point of the media 20 with fixture 115. $F_r$ 123 is a fixed construction in millimeters based on the orthogonal distance between the spindle 42$a$ rotational axis and pivot point 308. The inventors have determined a preferred distance of 103.188 mm is optimal, and typically will not vary between machines.

Based on the right triangle 120, the well-known Pythagorean formula of
$H^2=b^2+p^2$ is applicable where the hypotenuse squared equals the base squared plus the square of the perpendicular height. The square of the distance R 116$c$ equals the squares of the base 116$a$ and perpendicular height 116$b$. Hence, in accordance with the FIG. 13,
$R^2=116a^2+116b^2$, solving for R, we get:

$$R=\sqrt{a^2+b^2}$$

Based on the values set forth in FIG. 13, value R in millimeters is equal to:

$$\sqrt{(\text{fixture offset})^2 + (M_r + 103.188)^2} \text{ And,}$$

$$\beta = \tan^{-1}\frac{\text{fixture offset}}{(M_r + 103.188)}$$

Therefore, for a predefined printing gap or jetting distance 126 fixture radius of 103.188 mm, member 303 must be adjusted downward ($d_z$) responsive to the tilting of member 304 and also printing carriage 19 must be adjusted horizontally to begin printing in a designated location along the media surface location Y 114 in accordance with the following:

$$d_z=R*\sin(\lambda+\beta)-(M_r+103.188)$$

Linear servos 311 are, hence, adjusted differentially in order to achieve this positioning for each unique media shape. For operator and processing convenience, a table for various sizes of media diameters listing heights R may be prepopulated and saved in memory to be recalled when the operator inputs media field geometries into the LSINC HMI.

Because an angled surface 121 presents an increased or decreased $R_i$ 119 depending upon the surface shape of media 20, an image having a fixed width X and height Y uses a predetermined amount of ink for a particular image for an area X×Y, as will be understood. Because $R_i$ varies, in order for an image to be placed on an angled object surface the amount of ink must also be varied in order to avoid over inking the surface for any $R_i$ that is less than the maximum $R_i$ on the object surface. Hence, a gradient mask must be generated as part of a profile for any imaging job in order to proportionately reduce the amount of ink in response to the degree of angled surface present on the object 20. This is accomplished by utilizing a third-party illustration software application, such as for example Adobe Illustrator, to create a separate drawing layer for the image artwork to be applied to the media object 20. The separate layer (e.g. called a "knockout" layer) is created as the top most layer using a "process white" that will not actually cause ink to be jetted. It reduces the opacity of all lower levels by its presence. The target reduction is created by applying a gradient opacity to this layer. The gradient starts at 1% of ink removal at the largest diameter and increases per the following equation at each position in the artwork with a corresponding $R_1$ diameter:

Knockout percentage at a given position=(1−(media diameter at position)/(max media diameter))× 100%

These values are saved in the image file that is processed through a raster image processor or "RIP" to create a printer specific file for transfer to the PC controlling the print job prior to execution of the print, as will be further discussed job.

Precise control of motion of several elements in machine 10 allow for the precise application of ink onto the surface of object 20. This is achieved by driver boards sending signals to actuators in a coordinated manner. The signals sent by those driver boards may be controlled by a profile function defining a set of X and Y coordinates saved in memory and holding nonvarying information resulting from field inputs provided by an operator through the LSINC HMI interface. Those X and Y coordinates are derived from the equations shown above and are unique for each print job.

All control signals from driver boards to control motion in machine 10 are initiated from a Windows based O/S software control system run by a PC 50 housed underneath loading section 13, with display screen connected to the Windows OS held by support 16 (see FIGS. 1-2). Print initiation occurs from signals sent by the PC to motion a controller 191 which then controls a series of motion means as part of a motion control subsystem 170 (see FIG. 14) via an EtherCAT communications system 179. Alternatively, they could be supplied by a non-Windows operating system with the proper reconfiguration.

Figure 14:
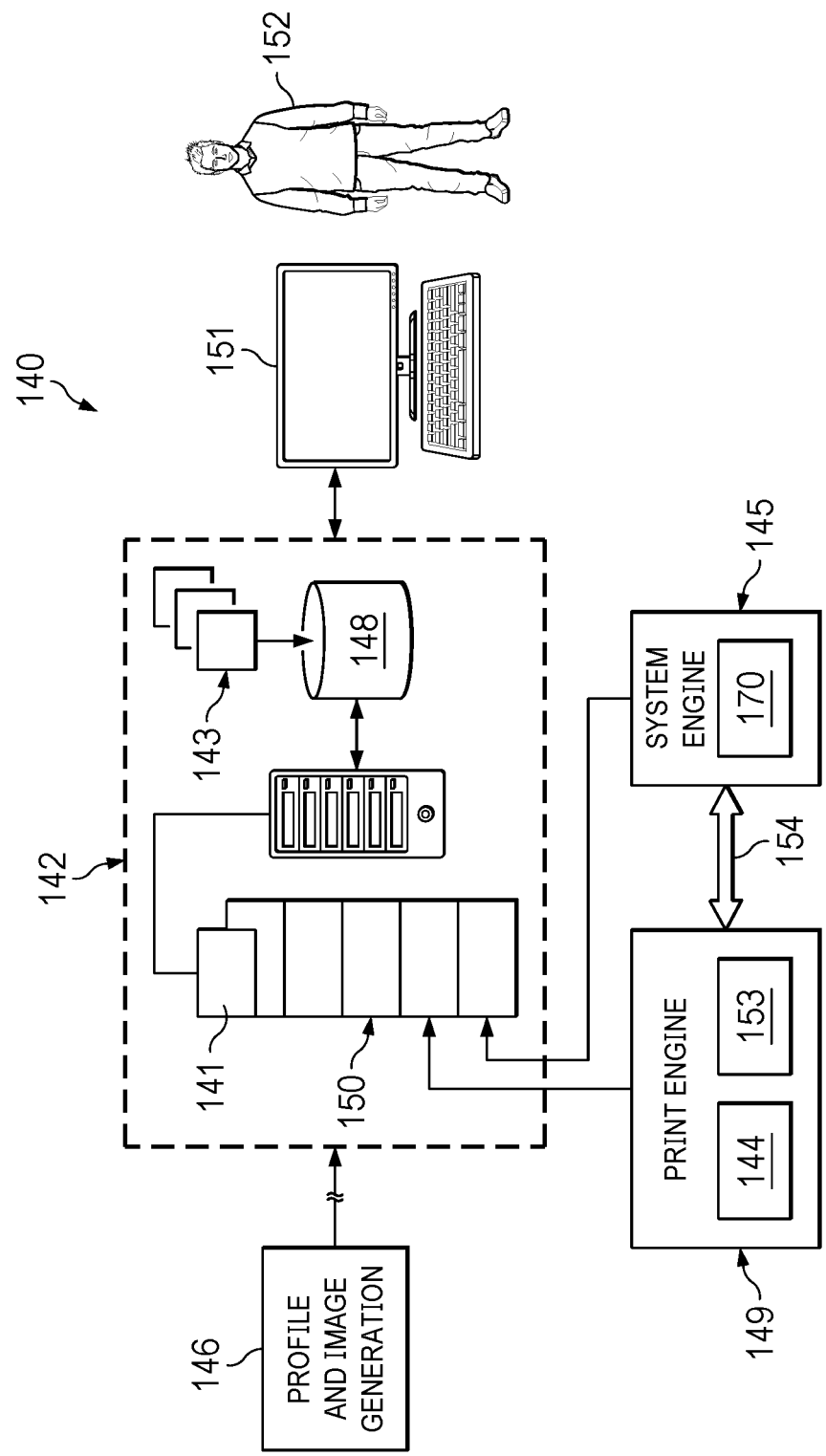
FIG. 14 is a top-level software control diagram showing the relationship between the machine operating system and control signals sent to electronic control systems.

Referring to FIG. 14, a software control system 140 includes Windows OS 141 running on PC 142 having suitable storage 148, display output and user control elements 151, and output communications means as is commonly available in modern PCs. Computer storage 148 holds configuration files and library files 143 (e.g. DLL files) to enable system 140 to utilize loaded files from a print job profile generation process 146 that provides input into system 140 to operate printer system 10 for a print job. Process 146 includes the generating of an image/graphic file for printing onto media 20, and the generation of a geometry file that includes geometric information corresponding to the surface configuration of the media object onto which the image will be applied in the system 10. The image file includes color and ink level reduction values referred to herein as a "gradient mask" for reducing the amount of ink released responsive to surface slant values, as discussed above. The print job profile is held in PC storage 148 as a set of files 143 loaded onto PC and utilized by HMI applications loaded in memory 150. A keyboard and display 151 allow for the generation of a human machine interface (HMI) for an operator 152 to initiate and monitor a print job and for the loading of media onto the machine through loading area 13. As mentioned above, the LSINC HMI overlays the INX HMI and replicates and extends the capabilities of the INX HMI and the LSINC HMI is the interface that a human operator 152 utilizes.

Each print job comprises a specific "recipe" for each media object to be printed that includes the geometry of the surface of the object and an image to be applied to the exterior surface of the object. The herein described recipe is specific to each object to be printed upon and holds information about its size and shape. In practice, a graphic artist would create or obtain an image in a raster file format (i.e. a bitmap image), such as a jpeg, tiff, or png (portable network graphics) formats that they desire to be printed on the media object 20. That image is then converted into a vector-based image through the use of an illustration software application, such as for example Adobe Illustrator. The above-mentioned "gradient mask" is created using this illustration application as well as creating a vector output file, such as an Adobe Postscript file, that may be utilized by a raster image processor ("RIP") for actually printing the final image. The output from Adobe Illustrator may also produce a vector-based pdf (portable document format) file which is an acceptable format for a RIP to utilize. As is known, a raster image processor produces a raster image for output to printing hardware, such as inkjet printing hardware, that produces the image on print media. A RIP is preferred to control the printing hardware because a high-level page description language, such as in a pdf file format, may be utilized where specific image control may be obtained over the final printed image, such as printing resolutions, ink limits, and color calibrations. One acceptable RIP software application is ONYX RIP available from Onyx Graphics, Inc. located in Salt Lake City, Utah. The print file created by ONYX RIP is an .isi file type that separates color planes. This .isi file is supplied directly to the INX supplied print engine 149 for printing.

Print engine subsystem 149 is comprised of a software and hardware component. The software component, principally characterized by the INX HMI, resides on the PC and breaks up the received .isi file into print swaths which are transferred via a USB connection to the drive controller 191 (see FIG. 15). The print head drive controller 191 then communicates the color data to the respective print head drives to cause the print heads to print at an appropriate position and timing to print an image on the media. The timing of the firing and motion is synchronized through an encoder signal 172 (see FIG. 15) with the firing slaved to the encoder signal generated by motion control subsystem 170 (see FIG. 15). Further discussions regarding the timing, color control, and printing head actuation of print heads 57 in system 10 shall be omitted in as much as such printing methodologies are standard, purchasable items and well understood for digital printing in the printing industry and not necessary for a complete understanding of the herein described invention.

In addition to the .isi print file, a set of geometry values representative of the media object 20 are loaded onto the print system PC 142 and saved on PC storage system 148 as part of two files 143 necessary for each print job for each type of media object 20 to be printed upon. That geometry file is a simple comma separated variable listing representative of measurements of the media object 20, such as a radius value from the asymmetrical radial axis to the surface of the media along its length, the overall length of the media, the maximum width of the media, etc. The geometries may be generated in various known ways, such as for example a human operator taking physical measurements of the media, a scanning program scanning the media and generating geometries of the media, or a CAD program generating those geometric values (discussed below). Geometry values are entered into the LSINC HMI and saved in memory and those values are translated and sent to a motion controller as a .lcn file over a USB connection. The media geometries file utilized by the LSINC HMI allows it to send commands to the INX HMI through the DLL file during printing to vary ink pressures to compensate for inkjet head movements during printing. Hence, as may be understood, the combination of the image file holding the graduated masking layer and a geometry file constitute a unique recipe for the printing of an image onto the surface of the media object 20. That recipe information is held by the PC 143 in its storage 148 and the combination of the LSINC HMI and the INX HMI utilize that recipe to execute each print job.

Print engine 149 includes an ink delivery system 144 that controls monitoring of ink levels in various containers in machine 10, pressure within ink tubes for consistent delivery of ink from tank to tank, and pressure delivered to the individual print heads. Engine 149 controls the drivers 153 for each print head and appropriate print head nozzle firing responsive to the requirements of each print job. Engine 149 also controls the generation of color ink signals to each print head to express each image color at the appropriate position on the media object surface as it rotates and moves laterally past the print heads.

System engine 145 provides top level system control of motion subsystem 170 (see FIG. 14) which controls the motion of the media held by the print carriage, and all elements for printing and curing an image printed onto the surface of media 20 loaded into machine 10. The PC 142 controls the LSINC HMI communicating the status and available commands to human operator 152, runs the software portion of the print engine, and displays the HMI via display and keyboard arrangement 151 for interaction and for command inputs, and other data, to be sent to the hardware portion of the print engine 149.

Figure 15:
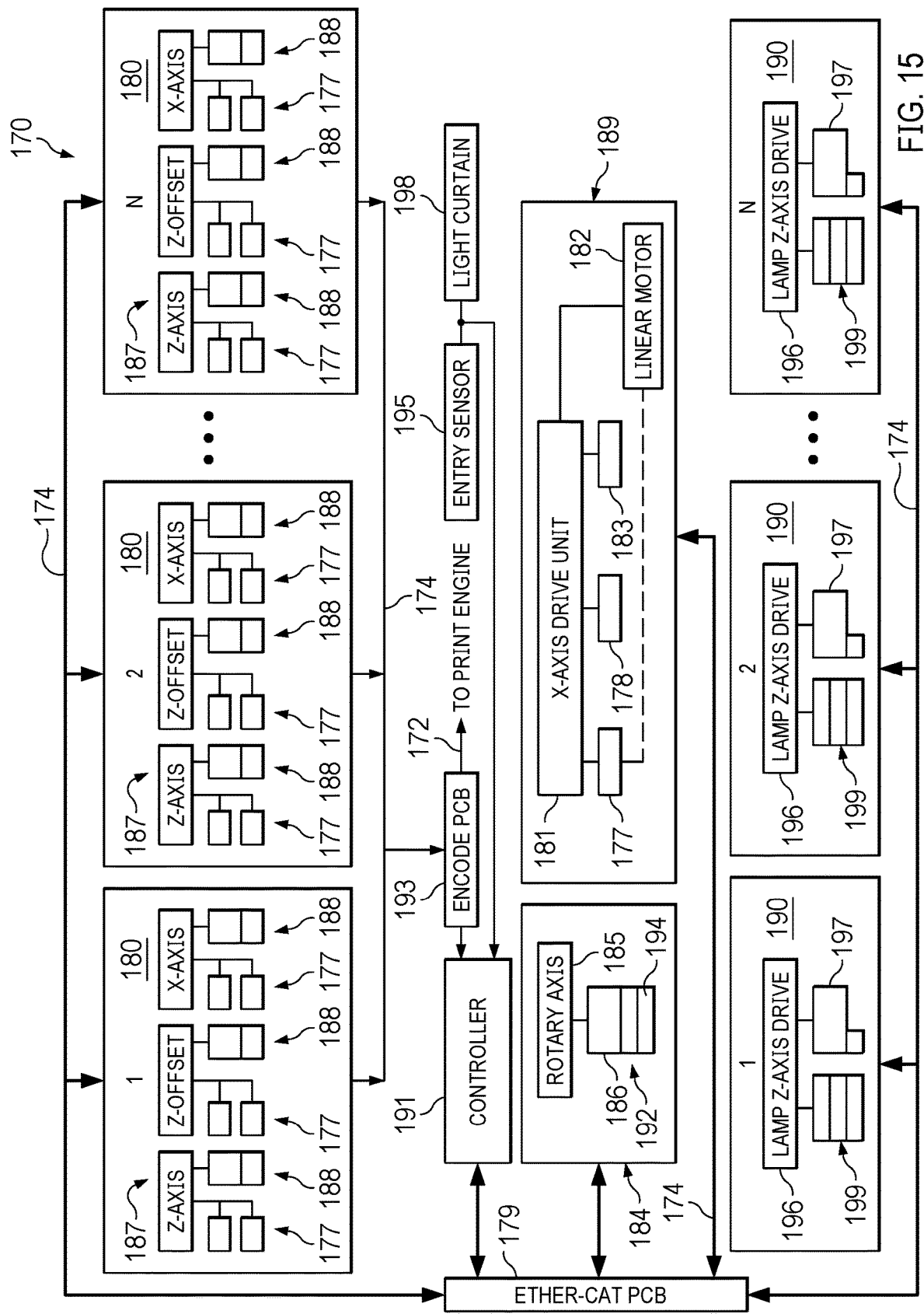
FIG. 15 is a function diagram showing the flow of control signals between various elements of the motion control subsystem of the single media printer.

Referring now to FIG. 15, it may be seen a function diagram showing the flow of control signals between various elements of the motion control subsystem 170 of the printing system 10. Subsystem 170 includes a collection of encoders functionally connected to a collection of movement means (e.g. 188, 186, 182, and 197), sensors (e.g. 177, 199), and controllers or "drives" (e.g. 187). The elements shown in FIG. 14 are functionally depicted, but are also generally shown for illustration purposes in their spatial position relative to one another. As is known, each drive may be implemented as a separate PCB and include its own development tool kit that enables controller code to be created and stored in non-volatile memory of each drive board during system operation. The use of an EtherCAT compatible drive presents motor and drive as a servo axis that can be managed via standard EtherCAT protocol. Movement means consist of either DC stepper motors or synchronous servo motors, and are driven by dedicated driver boards controlled by controller 191. Communication between each driver board and controller 191 is accomplished via a plurality of communication cables 174 using standard EtherCAT protocol connected via EtherCAT PCB 179 that allows for an update time of at least 2 ms between elements. In the preferred embodiment, 187 axes are maintained simultaneously in the system 170, with a 2 ms response time which is sufficient to achieve an operative system using this number of axes.

Each movement means includes an encoder to ensure continuous feedback as to axis position in the system 170, and to ensure movement compliance within a bounded position set. Each electronic movement subsystem uses sensors and encoders to provide closed-loop feedback as to the position of any axis relative to media object 20. Such sensors are typically integrated with each movement means, such as a solenoid drive having integrated position sensor logic.

As shown, print carriage servo solenoids 311 (FIGS. 10-12) includes a series of electronic movement control subsystems 180 having a Z-axis drive, Z-axis offset drive, and an X-axis drive 187, each with their own set of home sensors and limit switch sensors 177, and a linear actuator with encoder 188. Each subsystem 180 is required for each servo 311, which in combination together make up a pair of servos 311 (see FIGS. 10-12). In the preferred embodiment, system 170 includes subsystems 180, one for each print carriage servo solenoids 311, but print system 10 shows only two solenoids, the inventors contemplate additional servos to allow for finer angular control of the print carriage 19.

An X-axis movement along path 127 (FIG. 13) for object 20 is accomplished with subsystem 189 having a drive unit 181, a linear motor 182 and encoder 183, and home sensor 177 and limit switch 178. An optical encoder 194 (not shown) is positioned adjacent to tail stock spindle 59 to provide position information on media 20 position along path 43 to provide a closed position feedback loop with X-axis drive 181. An entry sensor 192 and light curtain sensor array 198 optionally provide additional feedback to controller 191 for operator and machine safety. Subsystem 189 is connected to controller 191 via EtherCAT communications line 174. Rotary movement of media 20 occurs via rotary axis subsystem 184 having a drive unit 185 on a PCB, a motor 186 and position sensors 192. X-axis subsystem 189 is configured so that linear motor 182 is a slave relative to rotary axis subsystem 184, rotary motor 186, and all solenoid subsystems 180 are slaves relative to linear motor 182. This slave arrangement achieves satisfactory print head movement to follow object surface 121 through the constant sloped surface 121.

Each curing lamp bank 58 (see FIG. 8) includes an electronic subsystem 190 similar to print carriage subsystems 180. Each subsystem 190 includes a drive unit 196, an actuator 197 with encoder, and four sensors (home, limit, front, and rear) 199. Lamp subsystems 190 are connected to controller via EtherCAT cable 174 as shown. Bank 58 preferably includes 7 subsystems 190, one for each UV lamp, but are scalably arranged to accommodate less or more lamps than those shown, depending upon the machine operational requirements.

Through cable 174 and EtherCAT control board 179, motion controller 191 commands the individual drives through the EtherCAT protocol to control each movement means, thereby providing coordinated movement of all elements in subsystem 170. For system level movement coordination, an encoder PCB 193 ties timing signals between print engine 149, ink delivery system 144, and motion control subsystem 170 via cable 172. An optical encoder 194 residing on the rotary axis 185 provides timing fire pulses to encoder PCB 193 which distributes the same signal to the motion control system 170 via cable 174. Rotary axis PCB 192 conditions the signal and simultaneously passes it to the head drive controllers of print engine 149. This allows for the system 10 to communicate the X position of media 20 as it travels along path 122 within print area 25.

Satisfactory off-the-shelf components for sub-system 170 shown in FIG. 15 are listed in Table 1.0 below:

TABLE 1.0

| FIG. 15 Element No. | Element Name | Mfg./Part No. | Description |
|---|---|---|---|
| 182 | X-axis Linear Motor | Parker Automation/ 406T14LXRMP | Linear Motor |
| 181 | X-axis Linear Drive | Kollmorgen/AKD-P00: 306-NBEC-0000 | Drive Unit |
| 183 | X-axis Linear Encoder | Integrated with Linear Motor | Integrated Encoder with home and limit switch in motor |

TABLE 1.0-continued

FIG. 15
Element
| No. | Element Name | Mfg./Part No. | Description |
|---|---|---|---|
| 186 | Rotary Axis Motor | Kollmorgen/PN: AKM23D-EFGNC-OO | Motor |
| 185 | Rotary Axis Drive | Kollmorgen/PN: AKD-P00306-NBEC-OOOO | Drive Unit |
| 192 | Rotary Axis Encoder | Renishaw/PN: TI0100A-40E | |
| 191 | Motion Controller | Trio Motion Technology LLC/PN: PB62 & P914 P862 + PB78 + 5x P914 | Quad Core uP w/support up to 64 Remote Axes |
| 187 and 197 | Linear Actuator (head & lamp manipulators) | Thomson/PN: MLUA051S 1B-0100-03000SFSS-001 | with 4k ppr differential encoder (use "FAS for x-axis, w/anti-backlash nut, 1.3 inch lead, no encoder) |
| 188 and 196 | Linear Actuator Drive (head and lamp manipulators) | RTA/PN: CST ET Model 94 | Drive Unit |
| 177 | Limit sensor for home position & end of travel position(head & lamp manipulators) | Panasonic/PM-25/45/65 series u-shaped micro photoelectric sensor | Photo-electric sensor |
| 177 | Head and Lamp Crash Sensors (front and rear)(head and lamp manipulators) | Panasonic/Ex-11B | Sensor |
| 63 | Curing Lamps | Phoseon/Fire Edge FE400 120 x 10AC 385 nm w/rod lens PN: 33607 | Enhanced body style with air filters & glass protector |
| 198 | Safety Light Curtain Sensor | 14 mm resolution, finger protection; <50 ms response time | Dual Zone: operator station location and print area termination |

As indicated above system 10 relies upon an installed ink supply subsystem purchased from Inx International, referred to herein as an "ink delivery system." However, in order for system 10 to print images with consistent ink quality onto media surface 21, delivery of ink through print heads 57 requires repeated calibration of the ink delivery system in order to compensate for movement of the machine from one location to another and for empirical calibration of different types of inks. In an industry standard print system, ink delivery system 45 provides a static vacuum to a series of ink supply lines from ink reservoirs (not shown) held in closed cabinets of machine 10 in a plurality of ink containers (not shown) positioned proximate to ink heads 57. Electronics held in bay 23 control vacuum system assembly 27 to deliver ink from the ink reservoirs to interim tanks, and also to print heads 57 via a system of tubes (not shown). Each tank also has its own pressure line via one of the manifold fittings that forces ink from tanks to each print head 57. While standard ink delivery systems use static pressure to delivery ink to print heads, the disclosed system 10 modulates the delivery of ink to each print heads from each tank 31 to compensate for the changes in environmental factors in which each machine 10 operates. The optimal pressure settings in mBar are determined prior to each print job or at each site calibration to ensure the inkjet print heads do not weep ink. Based on the density of each respective ink used, a revised pressure value is calculated in mBar based on its distance from home in millimeters and the ink's specific gravity. The pressure value is calculated using the following formula:

Pressure at position=Pressure at home+x(specific gravity of the ink/relationship between mmH20 and mBar of 10.197 mBar/mm)

This information is communicated via a USB bus connected to the ink delivery system 144 (e.g. the JetINX's ink delivery system) to permanently set a resting weep pressure value which varies with environmental factors, such as altitude, humidity, and target ink viscosity.

As described above, based on the height, calculated angle or taper, and maximum projected diameter of the media, the system makes geometric calculations to position the media 20 on carriage 19 for printing. A targeted graphical image for printing is exported into a format acceptable for printer ripping. A ripping tool then generates a printer specific file representing the image to be printed and a gradient mask calculated based on the media object geometries and recorded in a geometry file. The printer specific file (.isi) for the media object to be printed is then transferred via a thumb drive or other common transference method to Windows PC 142 along with all necessary support files as required by print engine 149. The object to be printed (i.e. the media object 20) is loaded by the operator 152 onto spindle 42a,b with axis 107 of the object properly aligned with the rotational axis of spindle 42a,b. Using the HMI on the Windows PC display 151, the operator 152 then moves carriage 19 holding the spindle 42a,b and object 20 into the loading area 13 and loads the media onto the spindle. Inks suitable for the object surface print job are preloaded in machine 10 and ready for use as is known. The print job is then initiated and the object 20 manually advanced along path 43 (see FIG. 5) from the loading area into the printing tunnel 25 to a predetermined start point. The media 20 then is spun at a predetermined rotation rate and ink applied onto the object surface at the correct rotational location along print path 122 as print carriage moves from the start point along path 43. Carriage 19 holding the object 20 moves a distance $Y_{0-i}$ 114 at a constant velocity 127 as ink is expressed against surface 121 from each print head 57. Responsive to motion control signals issued by controller 191, and as synchronized with print engine 149 via encoder PCB 193, each print head 57 applies ink across the surface for an assigned swath of image coverage on the media surface 121. As is understood, each print head color is overlapped in a coordinated fashion at the same location on the object's surface so that predetermined colors are achieved on the objects surface to create the preloaded image. Individual UV lamps 58 held by headplate assembly 60 are initiated in a spaced relation to object surface 121 underneath rotating object 20 as it progresses along path 122, thereby partially curing ink applied to the surface of object 20 and then fully cured under lamp 59. Once the object has been printed and end of print distance 114 reached, the object is returned to the home position and withdrawn by operator 152 from the loading area 13. The process may then be repeated for further objects to be printed, except that the print job profile generation and file loading steps may be omitted if the object to be printed is the same as the previous object and the image is the same.

Figure 16:
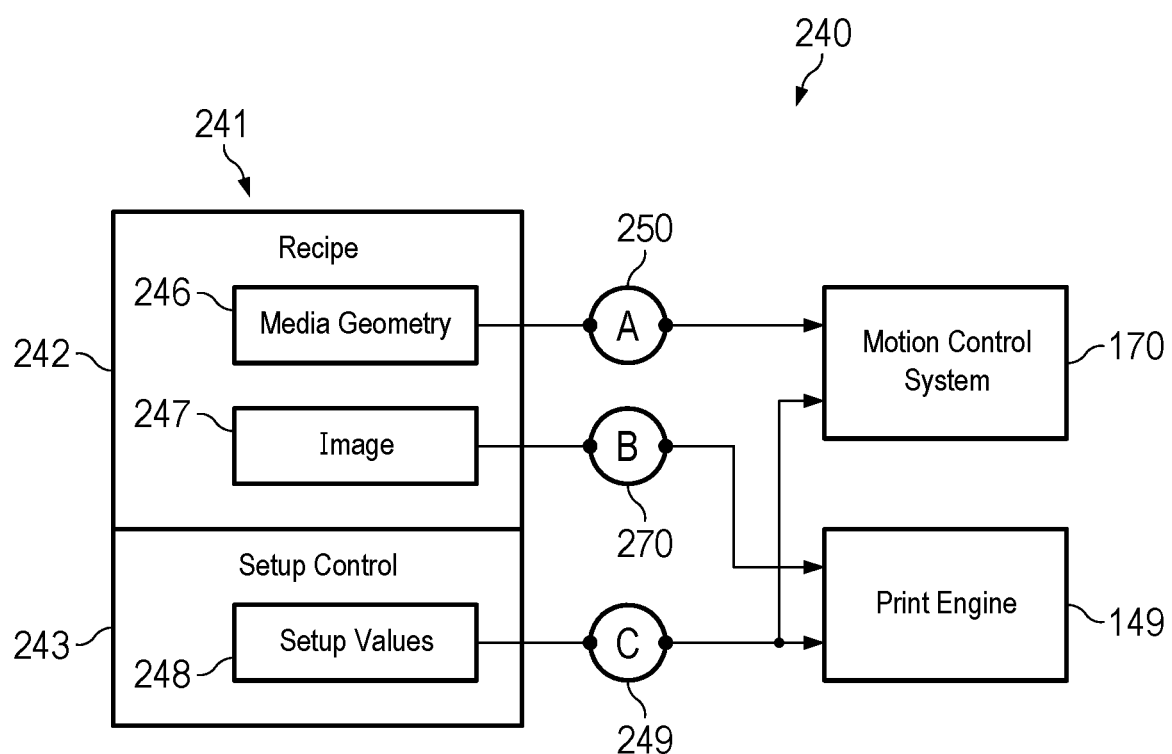
FIG. 16 is a data flow diagram showing the flow of information from a media object recipe to the single media printer.

Referring to FIG. 16 it may be seen a recipe 241 having an object recipe 242 and a setup control 243. The object receipt 242 includes media geometry 246 and an image for printing 247, such as a graphical image. The setup control 243 includes a set of setup values 248 for use by the printer 10. Media geometry information is processed as indicated above and sent to the motion control system 170 to control the various subassemblies of printer 10, and image information 247 is processed and transferred to print engine 149 for generating ink at the proper location on the media object 20. Previously entered setup values are also sent to both the motion control system 170 and the print engine 149 responsive to environmental constraints of the ink, the printer configuration, and media object properties.

Once saved on PC system 142, the LSINC HMI passes the values to motion controller 191 in subsystem 170 via an Ethernet connection 262 to cause coordinated motion of the various head assembly and lamp assemblies 263. The LSINC HMI is configured to list various available geometries for media saved in a known directory on storage system 148 from which an operator may select a desired geometry in executing a print job, and from which the HMI may automatically re-select for continuous media print jobs, thereby also facilitating the repeating of print jobs for the same media type by avoiding additional operator involvement.

Figure 17:
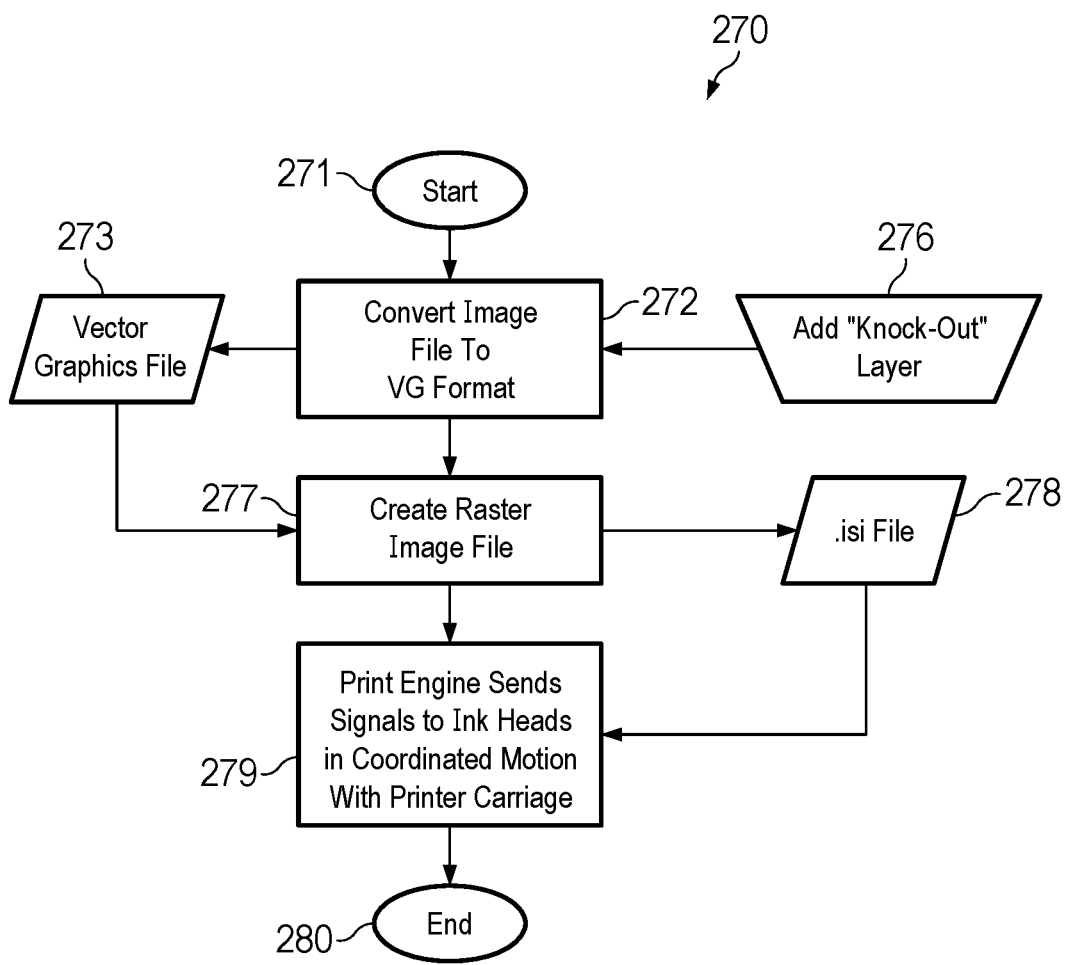
FIG. 17 is a process flow diagram for generating print profile data for image generation in the single media printer.

Referring to FIG. 17, with references to elements in FIG. 12 also, process B 270 prepares and passes print image information to print engine 149. The process 270 requires that an image be created or obtained 271 and the image be converted 272 into a vector graphics format (VGF) to produce a vector graphics file 273. During the conversion process 272, a "knock-out" layer may be added 276 to eliminate over inking during printing, as discussed previously. A RIP is then used on the VGF file to create a raster image file 277 which typically ends in an .isi file extension 278. The .isi file is then saved into the same storage directory location as an automatically generated .lsg file in system 142. The operator may select or input this directory location on storage system 148 into the LSINC HMI which also communicates this directory location to the INX HMI so that it may utilize the .isi file during printing. Once the directory location is set, the LSINC HMI presents a listing of all potential .isi files available for printing and the operator selects an .isi file for printing.

Figure 18:
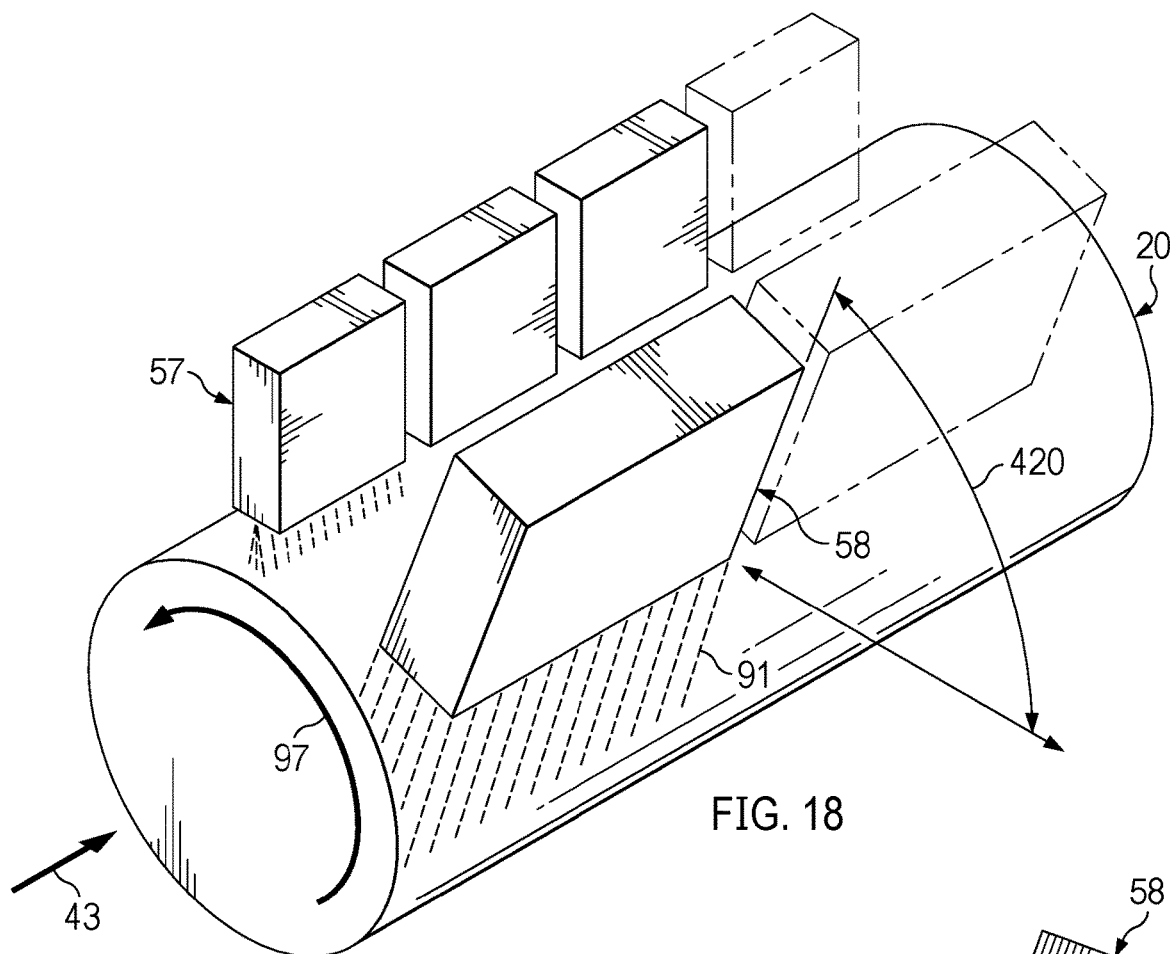
FIG. 18 is diagrammatic perspective view of the arrangement of a serial bank of ink printing heads in relation to an adjustable UV pinning lamp above a rotating piece of media.
Figure 19:
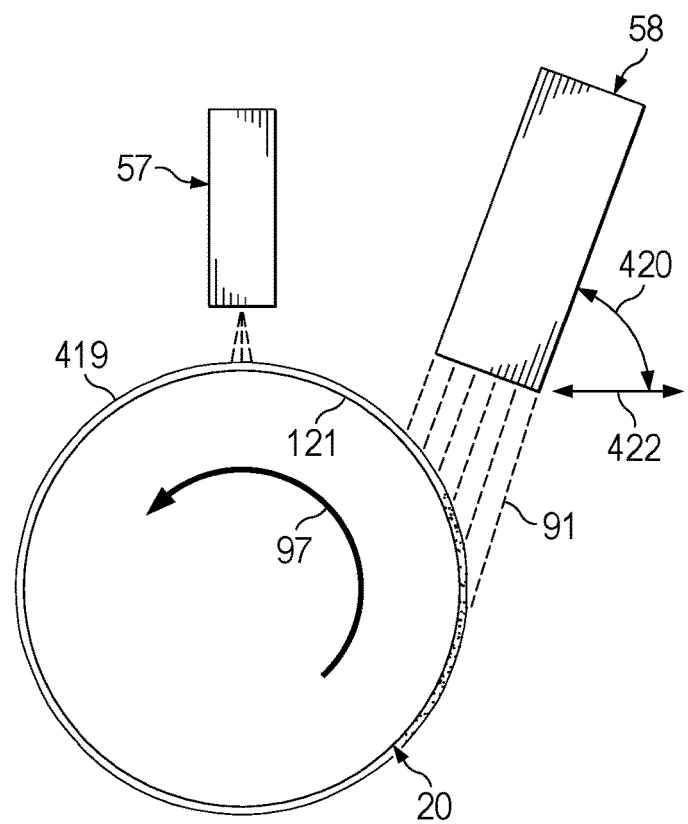
FIG. 19 is a diagrammatic elevational view of the arrangement shown in FIG. 18.

Referring now to FIGS. 18-20B, it may be seen the positioning of UV pinning lamps 58 relative to the printheads 57 within tunnel 25. With respect to the inkjet print heads 57, the present invention allows for a serial alignment of each individual print head as shown in FIG. 18. A serial alignment configuration of inkjet print heads allows for the best quality deposition of ink onto the surface of the media 20, producing the best register of colors in a deposited image, because a continuous non-overlapping deposition of ink is applied over the entire surface of the media. Further, a serial arrangement of inkjet heads permits in the present invention the printing of satisfactory images over a limited contoured surface of an axially symmetric media surface because such a serial arrangement allows for a wider printing slope path while maintaining An optimal jetting distance to apply an image. Alternatively, as shown previously in FIGS. 8 and 9, print heads 57 may be arranged in a staggered configuration. A staggered configuration (FIG. 9) permits faster printing, thereby increasing print job throughput. Increased speed is possible because at least 5 of the available inkjet print heads overlap in ink deposition which minimizes the time required for a piece of media to traverse within tunnel 25 while achieving full curing of all deposited inks. However, in order to use the overlapping or staggered configuration, headplate 60 must be slightly shifted so that the top-dead center (i.e. zero degrees or highest point of media surface) of the media must be centered between the space separating each staggered head. This accomplished by loosening bolts holding the headplate 60 and shifting it slightly to attain centering and the retightening bolts. The headplate itself must be manually shifted because the printer carriage 19 can only raise and lower the media 20, hence in a "Z" axis direction, but cannot move the media in a lateral or "Y" direction. While a staggered arrangement increases printing speed, quality is reduced somewhat because jetting distance cannot be optimized to the extent in the serial configuration, and also the amount of jetting variance is reduced, thereby reducing the ability to print over highly contoured surfaces.

Figure 20A:
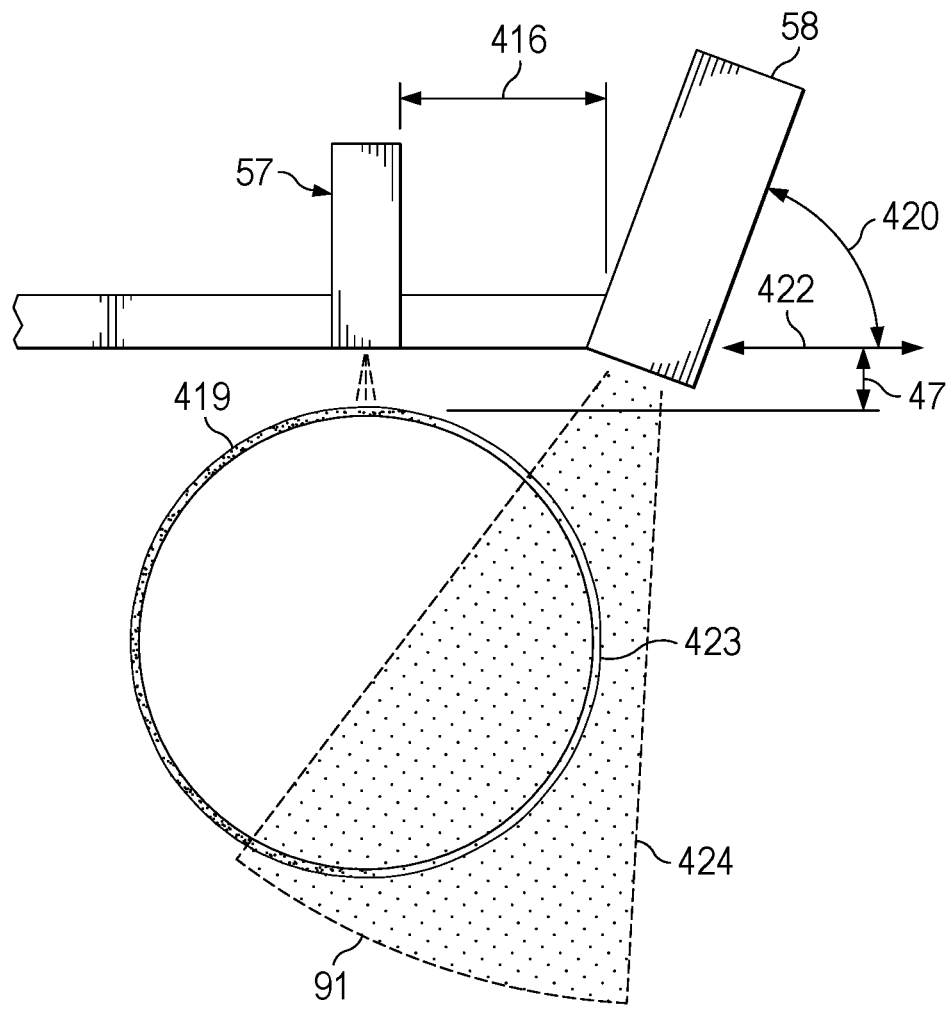
FIG. 20A is a diagrammatic elevational view of the arrangement of a serial bank of inkjet printing heads in relation to an adjustable UV pinning lamp above a rotating piece of media showing a substantially wedge shaped zone of UV illumination.

The adjustment of pinning lamps and final cure lamp(s) to accomplish the above indicated advantages, including all power calculations, reduced reflect techniques, and electrical signal processing and generation is identical for either a serial or staggered inkjet head configuration. The adjustment of the pinning lamp position is accomplished as discussed above with respect to the incorporated references and is controlled through the prior referenced HMI presented to an operator through a display held by the mounted display and adjusted manually by the operator. The HMI displays the settings required for any selected piece of media and the operator makes whatever adjustments to the head plate 60 that are required, including for example the lateral position of the pinning lamps, the tilt or angle of the pinning lamps in relation to the adjacent print heads situated over the media 20 responsive to the diameter of the media. UV light emitted from lamp 58 is angled such that the right most edge 424 of illumination zone 91 preferably coincides with the tangential edge 423 of object 20 as it rotates in a counterclockwise direction 97. The alignment of the right most zone edge 424 with the object surface 423 allows for the maximum emitted amount of UV light to be received on the rotating surface of the media 20 within the illumination zone 91. Further, zone 91 is optionally refined to align the emitted UV light rays with a collimator placed on lamp 58 to further reduce scattering. As shown, wet ink 419 is jetted or expressed by printhead bank 57 onto the surface of object 20 as the object rotates counter-clockwise. The wet ink 419 is then exposed to UV light when it reaches illumination zone 91 and partially hardens into a gel 421 so that the applied ink does not shift on the surface of the media 20 during further printing. This arrangement allows for the wet ink to fully spread or "wet" the surface of object 20 prior to exposure to UV radiation in zone 91. As the media rotates the slight rotational delay prior to exposure in zone 91 is important because it allows for a better artistic expression of the applied image. For example, the rotational delay allows for a more glossy, desirable image 96 to be applied to the object 20 when fully cured. Referring to FIG. 20A, clear media will expose ink to UV radiation below the potential tangency point 423 when the UV radiation passes through the clear media material, but given the rotational delay until exposure the point of UV impingement is sufficiently delayed to allow for full wetting of ink on the surface of a clear media object 20 to occur. Further, the downward UV light ray angle minimizes or even eliminates reflections on clear media so that printhead impingement does not occur. For translucent media, ink is exposed at the point of tangency 423 on the media with light scattering away from the ink heads 57 to avoid impingement. Critically, the downward angle of lamp 58 avoids UV light from impinging onto the nozzles of ink heads 57 on either type of media, thereby avoiding the fouling and deactivation of ink heads 57 during a print job when clear or semi-transparent media are being decorated. As shown, angle 420 of lamp 58 and the lateral position 416 along path 422 of lamp 58 may be adjusted in response to a geometry file associated with the dimensions of object 20 in order to optimize the positioning of lamp 58 so that the right most edge 424 of illumination zone 91 coincides with the tangency point 423. This maximizes the amount of pinning UV radiation applied to the widest possible portion of media 20 without exposing ink heads 57 to UV light, even when clear media are being printed upon with the associated potential reflections of UV light.

Figure 20B:
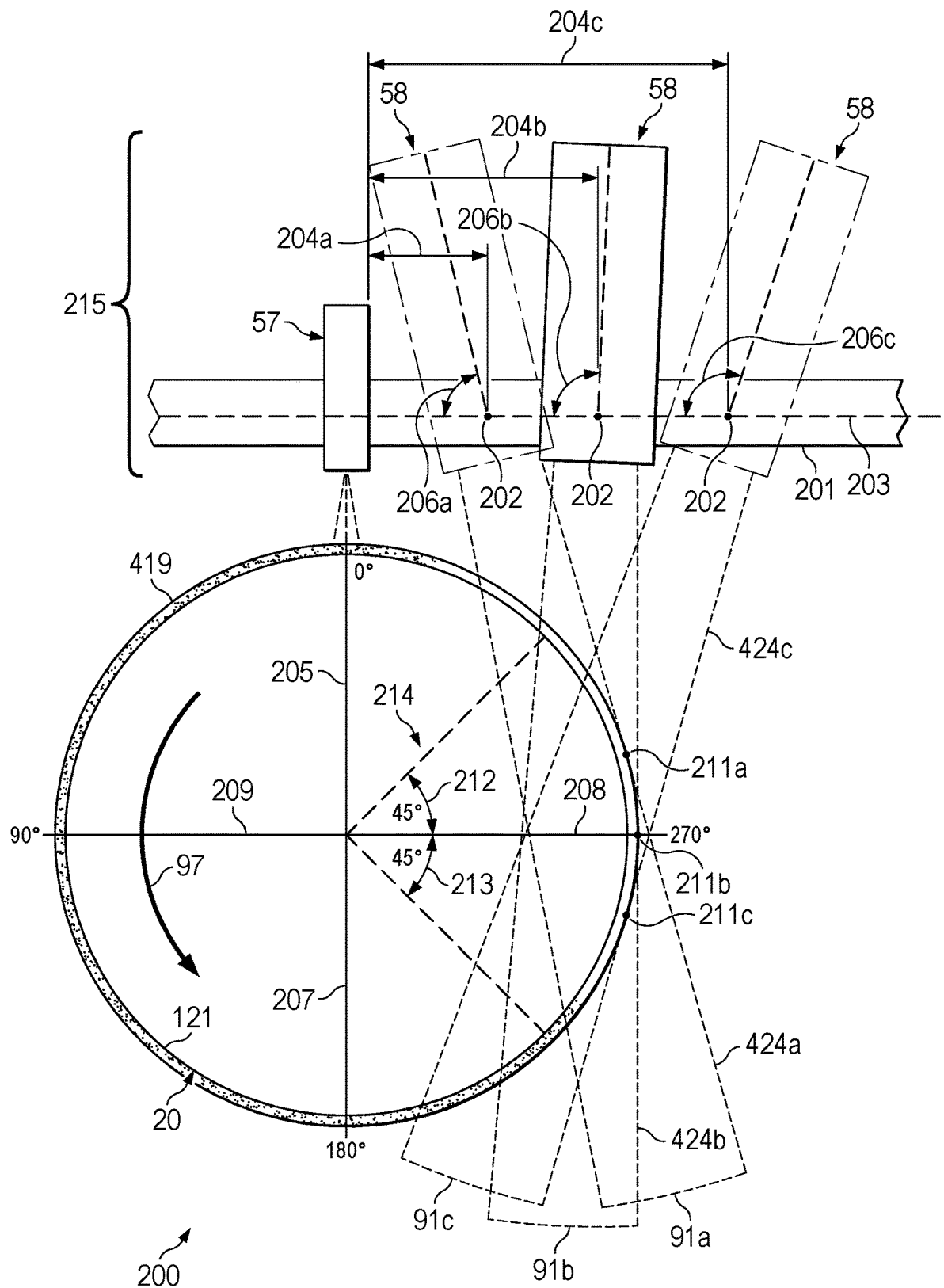
FIG. 20B is a view showing various positional arrangements of the pinning UV lamp in relation to the media and the inkjet printing heads, and the effect of such positions to create zones of UV illumination.

Referring to FIG. 20B, it may be seen various positional embodiments 200 of UV lamp 58 and the effect of such positional changes on the UV illumination of rotating media 20. Inkjet print heads 57 express ink onto the surface of media 20 in a wet condition 419 as media 20 rotates counterclockwise 97. During rotation, the surface of media 20 rotates into various angular zones demarked by angles of 0 degrees 205, 90 degrees 209, 180 degrees 207, and 270 degrees 208, thereby creating four angular quadrants of 90 degrees each. A preferred illumination area 214 may also be seen consisting of plus or minus 45 degrees (212, 213) from angular point 270 degrees 208.

In relation to inkjet printing heads 57, UV pinning lamp 58 may be moved into various lateral and angular positions 215 thereby altering the position of illumination field 91 issuing from lamp 58. As previously described, inkjet heads 57 and UV lamps 58 are supported by frame member 62 but also extend just below the lower surface 201 of frame member 62 so as to interact with each piece of media 62 when inside tunnel 25 during a printing operation. Lamp 58 may be adjusted to move laterally away from printheads 57 along line 203 to various a user selected distances 204(a-c) as measured from the edge of printheads 57 to a center pivot point 202 for lamp 58. Pivot point 202 corresponds with a retaining grommet on the printing head board 60 to allow lamp 58 to be rotated into various user selected angles 206(a-c) as measured from a line bisecting lamp 58 and intersecting pivot point 202, thereby forming an angle 206 with line 203. Line 203 is parallel with lower surface 201 and also intersects pivot point 202 as shown. Angles thus formed may range preferably from approximately 70 degrees 206a, 95 degrees 206b, or 120 degrees 206c. As will be understood, by varying the lateral and angular position of lamp 58, a UV illumination zone or field having various coverage areas 91(a-c) relative to media 20 may be created.

Each field has a right most illumination edge 424(a-c) that varies with angle and lateral position such that intersection with ink layer 419 on the surface of media 20 creates a tangency point 211(a-c) at the intersection location. Each tangency point varies in relation to the lamp position, but is preferably located within preferred angular zone 214 that maximizes the amount of power impinging upon the ink 419 during rotation while minimizing any potential for reflectivity of UV light to intersect the nozzles on printheads 57. For example, for the media size depicted in FIG. 11, a preferred position of lateral distance 204b is combined with an angular position of 206b to produce an illumination field of 91b. UV light will therefore partially harden ink 419 as is passes through field 91b, including tangency point 211b and keeping wet ink 419 within zones 212 and 213 until gelled. By adjusting the lateral and angular position of lamp 58, a large range of media sizes and various types of inks may be accommodated within printer 10 without fouling the ink nozzles of the printheads 57 during printing.

Figure 21:
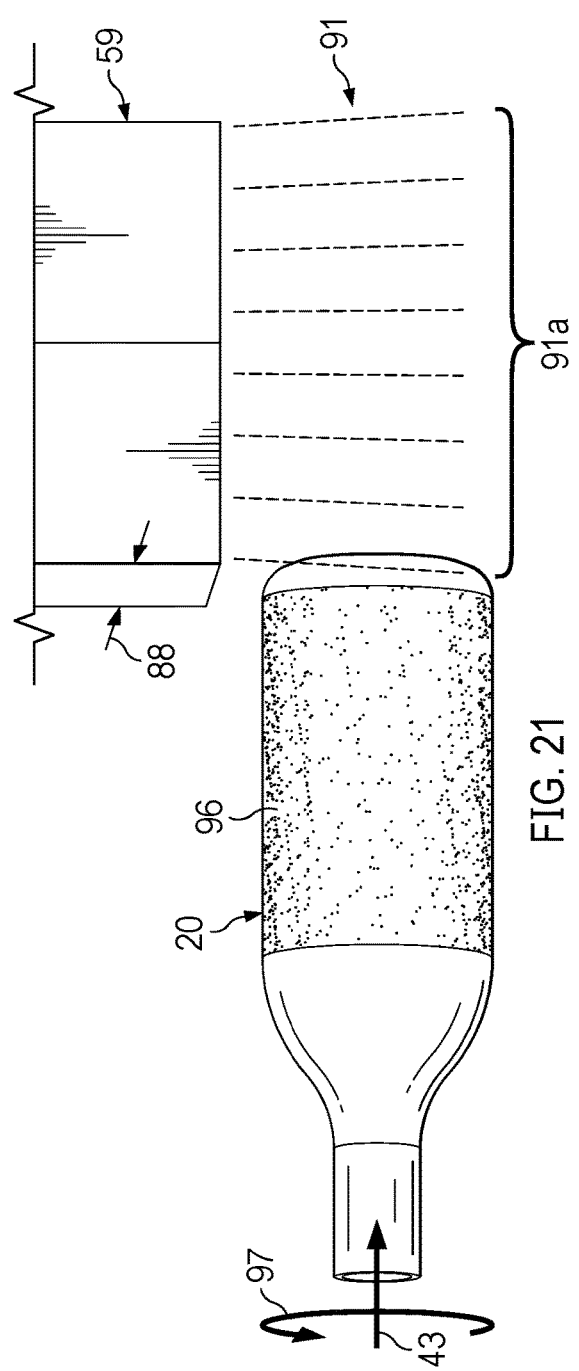
FIG. 21 is a diagrammatic view of a final cure UV lamp above a rotating piece of media as it moves under the UV lamp.

As part of the printing process, a power scale factor is utilized in order to maximize printing quality on the surface of the media as well as limit curing emitter dosage for each media object so that printer head fouling is minimized. Referring to FIG. 21, a power scale factor formula is presented below that allows for the calculation of the minimum amount of power such that a final acceptable UV cure dosage amount may be applied to the partially cured ink present on the surface of the (now) decorated media 20. As an article having a partially cured or "pinned" image 96 traverses further within printing tunnel 25 along path 43, it enters into an illumination zone 91 concordant with the length (91a) of UV cure lamp 59 as the object 20 continues to rotate 97 at a known speed. Each lamp has a known width 88 and a known power density as set by its manufacture. Also, each type of ink deposited onto the surface of the object 20 also has a specified amount of UV energy necessary to optimally cure the ink, which is either supplied by the manufacture of the ink or can be obtained relatively easily by empirical testing.

TABLE 2.0

$$\text{Power Scale Factor} = \frac{(\text{Rotational Speed of Media}) \times (\text{Step Distance per Media Revolution}) \times (\text{Media Perimeter}) \times (\text{Dose density})}{(\text{Distance of Exposure}) \times (\text{Power Density of UV lamp}) \times (\text{Lamp Width})}$$

Where:
Rotational Speed=Revolutions per Second;
Step Distance=mm per revolution that the media moves laterally along its axis of rotation during partial curing (element 43 in FIGS. 18 and 21-24B);
Media Perimeter (i.e. Object Circumference at Image Printing Location on Object Surface)=$\pi \times D$ in mm;
Dose Density=m Joules per $cm^2$ as determined by an ink manufacture specification or empirical testing;
Distance of Exposure=The Lesser of the expressed Image Height or Lamp Length in mm;
Power Density=mW per $cm^2$.

The Power Scale Factor or "PSF" in Table 2.0 is a dimensionless value and often is simply a scaling factor or a percentage of the maximum power density. Given the amount of energy required to cure the deposited ink and given the known amount of UV energy emitted by lamp 59, a power scale factor or PSF may be calculated using empirical UV dosage results so that the PSF may be utilized for future print jobs. This allows for the variation of various factors during printing to obtain optimal image quality on the exterior of the object 20. For example, if 20% of total dosage during pinning of an image 96 is applied, the lateral speed along path 43 and rotational speed 97 may be varied to accommodate a particular beam strength emitted from lamp 59 to achieve the remaining optimal dosage of 80%. Lamp width 88 is typically small (e.g. 20 mm) relative to the circumference of an object 20 such that redundant image exposure may be ignored. Further, each lamp 59 may include a collimator to reduce the fanning or scattering of illumination zone 91 prior to impinging upon the surface of object 20.

Another way to express the above PSF is with the following formula shown in Table 3.0 below:

TABLE 3.0

$$\text{Power Scale Factor} = \frac{\begin{pmatrix} \text{UV Dosage Applied to Expressed} \\ \text{Image During Partial Curing} \end{pmatrix}}{(\text{Time of Exposure}) \times (\text{Power Density of the UV Lamp})}$$

Where:
the UV Dosage Applied represents the total amount of UV energy applied over the expressed image in m Joules;
the Time of Exposure represents the total amount of time in seconds that the expressed image is exposed within the UV illumination zone 91 (See FIG. 20A); and,
the Power Density of UV Lamp represents the total power output in the partial curing lamp in mW per cm2.

As may be understood, for non-3D objects, such as flat media, the Time of Exposure may be found by dividing the distance of travel of the media under a lamp with the linear velocity of the flat media. However, for 3D objects that require rotation such as media described herein, the time of exposure is the fraction of the time that the UV illumination zone 91 is incident with the expressed image applied to the surface of the media along the perimeter or circumference of the media.

Using the formula shown in Table 2.0, an example PSF calculation is shown below.

Given a color ink curing dose density of 146 mJ/cm² an example calculated PSF would be:

$$PSF = \frac{(8 \text{ rev./sec.}) = (5 \text{ mm}/rev.) \times (238.7 \text{ mm}) \times (146 \text{ mJ/cm}^2)}{(40 \text{ mm Lamp Length}) \times (8000 \text{ mW/cm}^2) \times (20 \text{ mm})} = .218 \text{ or } 22\%$$

Figure 22:
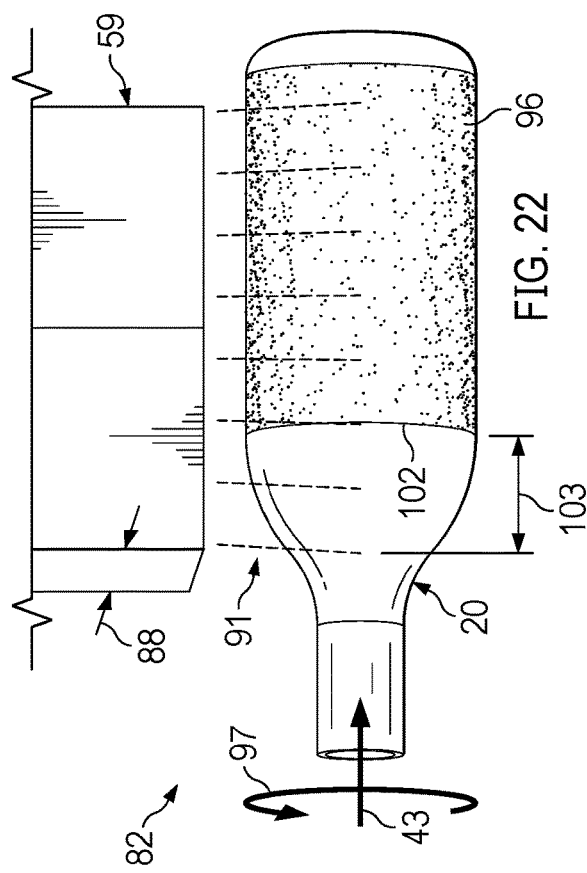
FIG. 22 is another a diagrammatic view of a final cure UV lamp above a rotating piece of media showing curing lamp intensity variations during a final cure step.

FIG. 22 shows an altered final cure step 82 to reduce the amount of UV radiation utilized in a final cure step. As object 20 moves under final cure lamp 59, the trailing edge of image 102 (i.e. the last part of an image that must be cured as the object moves from left to right and under the cure lamp within tunnel 25) moves under lamp 59 and at some distance 103 becomes fully cured. The remaining distance under lamp 59 thereby becomes superfluous for the purpose of curing. Therefore, lamp intensity may be increased during a last portion of lateral travel 103 to finish full curing of the image 96 and then lateral movement stopped rather than moving the object the full length of the image underneath lamp 59. This procedure thereby reduces the time of printing while also reducing the amount of duration of any potentially scattered light within tunnel 25. As can be appreciated, a full number of turns under the emitter must be realized in order that all parts of image 96 to receive the same minimum amount of UV radiation so that full curing is achieved. Table 4.0 below shows a formula for calculating the minimum number of turns required in order to achieve full curing.

TABLE 4.0

$$\text{No. of Turns} = \frac{\begin{matrix}(\text{Rotational Speed of Media}) \times \\ (\text{Perimeter of Media}) \times (\text{Dose density})\end{matrix}}{(\text{Lamp Width}) \times (\text{Power Density of UV Lamp})}$$

An example calculation is shown below calculating the minimum number of turns required for the specified equation values per Table 4.0. Given a 3D media having a circumference of 238.7 mm at the image location on the media, the following calculation leads to a minimum number of two (2) full turns to achieve full curing of image 96.

$$\text{No. of Turns} = \frac{(8 \text{ rev./sec.}) \times (238.7 \text{ mm}) \times (146 \text{ mJ/cm}^2)}{(20 \text{ mm Lamp Length}) \times (8000 \text{ mW/cm}^2)} = 1.74 = 2$$

FIG. 23 provides a further final cure option 110 for clear media. Lamp 59 includes left and right lighting segments 111,112. For clear media, left segment 111 is deactivated and only right segment 112 utilized for curing of ink on image 96, thereby removing the UV illumination field portion between location 114 and 113. This re-positions the UV source of light in tunnel 25 to the right and moving a potential source of scattered stray UV light away from ink heads 57. This option is selected through an operator inputted action via the HMI prior to the start of any print job.

FIG. 24A shows the traditional method 125 in which the entire 3D object is moved under a curing lamp for the entire length of the object resulting in the gross scattering of UV radiation 226, likely in a direction toward a printhead 57. The same traditional approach shown in FIG. 24A applies with a UV curing lamp emitter positioned underneath the object, which is the most common industry position standard for final curing of ink on 3D objects. FIG. 24B shows the improved, modulated approach 130. Two levels of intensity are used for lamp 59. While an image is being printed and pinned onto the surface of object 20, the entire object is moving into illumination zone 91. As image leading edge 132 enters the start of the illumination zone 131, intensity of lamp 59 is set at a value less than full value, for example 50% of full illumination strength, but modulated to an intensity value responsive to a final UV exposure value calculated in accordance with the PSF value to achieve complete curing. Object 20 continues to move forward into the illumination zone 91 along path 43. Once image 96 has been fully printed and pinned, the intensity of lamp 59 is increased to full power, or other second higher power depending about size and length of the image and lamp intensity, and again in accordance with the PSF value. The object continues through the illumination zone 91 until the left trailing edge 133 of image 96 attains a fully cured state. Since final cure lamp 59 does not use a full power level until after image 96 is fully printed, the total amount of UV light emitted by the cure lamp 59 is greatly reduced thereby reducing the amount of stray UV light at a high-power level being potentially scattered around the printing tunnel 25 during final curing of the media 20. Since many types of transparent or translucent media include concave and convex surfaces, like for example a smooth, curved neck surface, this UV power reduction process minimizes the potential for a concentrated beam of UV light impinging upon a print head, or if it does it would do so at a reduced UV effect.

Figure 25:
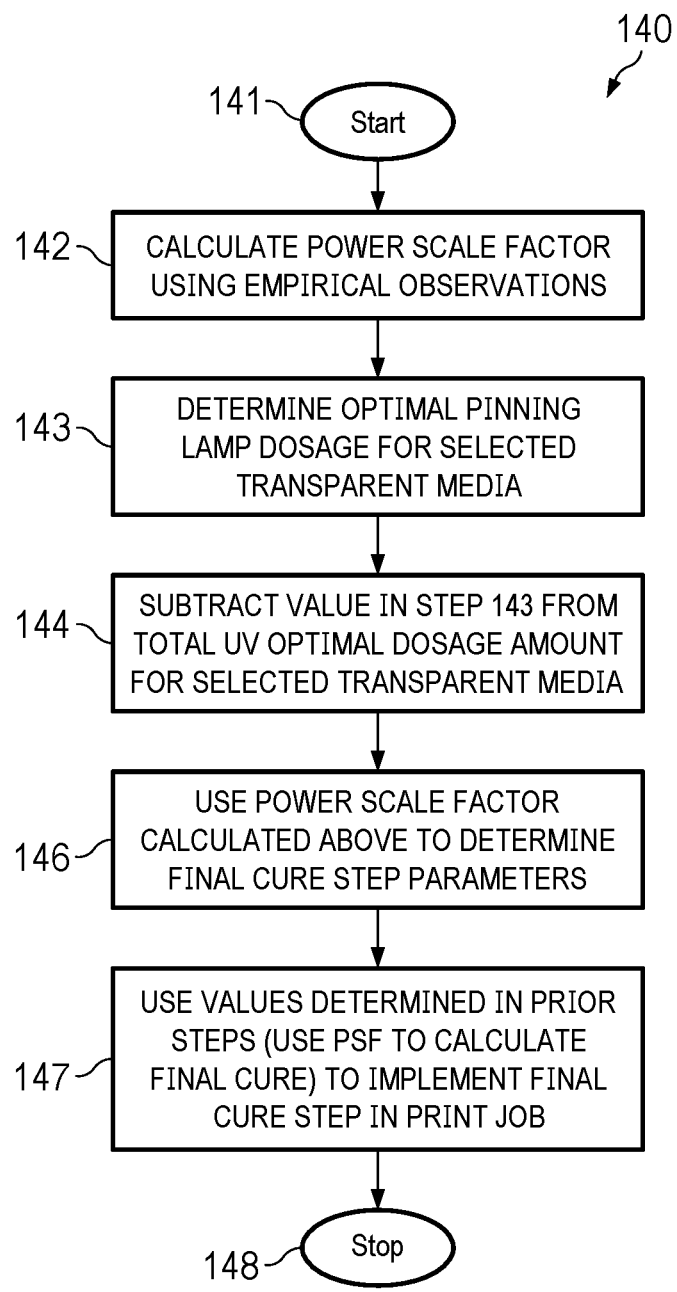
FIG. 25 is a flow diagram of using a power scale factor calculation for a final cure step in the disclosed decorating machine.

FIG. 25 shows a process 140 for using the PSF formula shown in Table 2.0 to control values in the printing process for the system 10. The process starts 141 by calculating a PSF by using empirical observations 142. Using the PSF value, an optimal pinning lamp dosage value is determined 143 for the transparent media 20 upon which an image is to be applied. The value calculated in step 143 is then subtracted from the total optimal UV dosage amount required to fully cure the image onto the surface of the media 121. The PSF is further used to determine the final cure step parameters 146 which are then used to implement a final cure in the print job for a piece of media 147, which ends the printing of a piece of media 148. For example, an optimal media rotational speed for the printing of a piece of media in the printer can be calculated as follows:

Rotational speed=(PSF×Distance of Exposure×Power Density of lamp×Lamp Width)/(Step Distance per Rev×Perimeter of Media×Dose Density)

Therefore:

Rotational speed=(0.25×40 mm×8000 mW/cm2×20 mm)/(5 mm/Rev×238.7 mm×146 mJ/cm2)=9.1 Rev/s or less to produce a satisfactory full cure.

Figure 26:
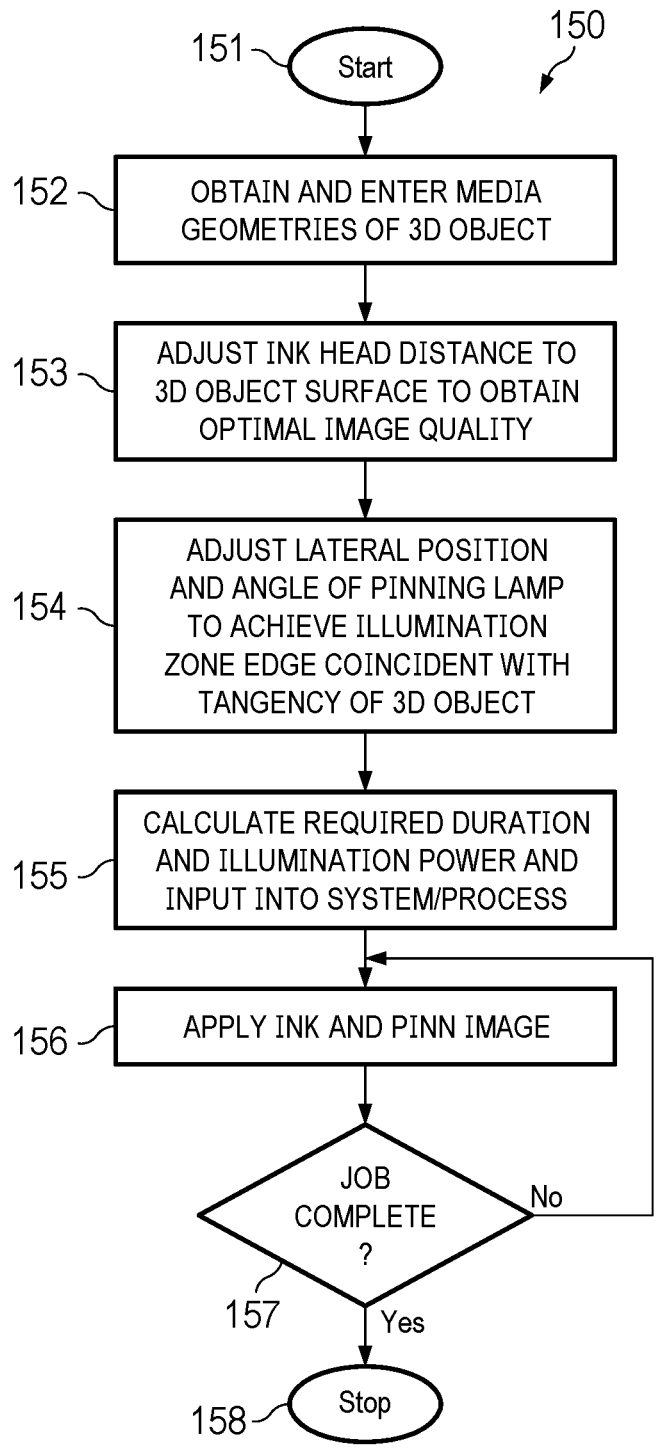
FIG. 26 is a flow diagram of a UV pinning lamp configuration process for pinning an image onto the exterior of a 3D object in the disclosed system; and, FIG. 27 is a flow diagram of a process for minimizing UV radiation reflections during final curing of an image on the exterior of a 3D object in the disclosed single media printer.

FIG. 26 shows the process steps for adjusting the machine 10 for use on a particular 3D media shape in order to realize the reduced printhead fouling characteristics of the herein described system in a print job. Process 150 starts 151 by obtaining the 3D object geometries 152 by either taking manual measurements of the object and inputting those values into the system HMI or by reading into the system a geometry file that specifies the geometry values representing the object from a recipe file provided for the object and its assigned image to be applied. Responsive to the geometries for the object, the height of the printheads 57 held in slots on headboard 60 above the media surface via print carriage 19 is adjusted 153 by raising or lowering the print carriage up or down along path 122 (FIG. 13) via commands issued to solenoids 311. The distance is adjusted 153 so that the printheads are optimally spaced 126 (FIG. 12) 47 (FIG. 20A) from the surface of the media to obtain the best image quality on the surface of the 3D object. Responsive to the maximum diameter of the object, the lateral position 416 (FIG. 20A) and angle 420 (FIG. 20A) of the UV pinning lamp 58 is adjusted 154 relative to the central rotational axis of the media 20 in order to position the pinning lamp illumination zone edge to be coincident with the tangency 211(a-c) of the rotating 3D object surface (see FIG. 20B). Using the formulas for the PSF shown in Tables 2.0 and 3.0, the required duration and illumination power for the pinning lamps 58 is calculated and set 155 to control the rotation rate of the media, the lateral advancement 43 and travel speed of printing carriage 19 in system 10. The ink representing an image 96 is applied and rotates into the illumination zone 91 to become gelled or "pinned" onto the surface of the object 156. This process of repeatedly applying and pinning an image onto an object surface is repeated until the print job is complete 157 and stopped 158.

Figure 27:
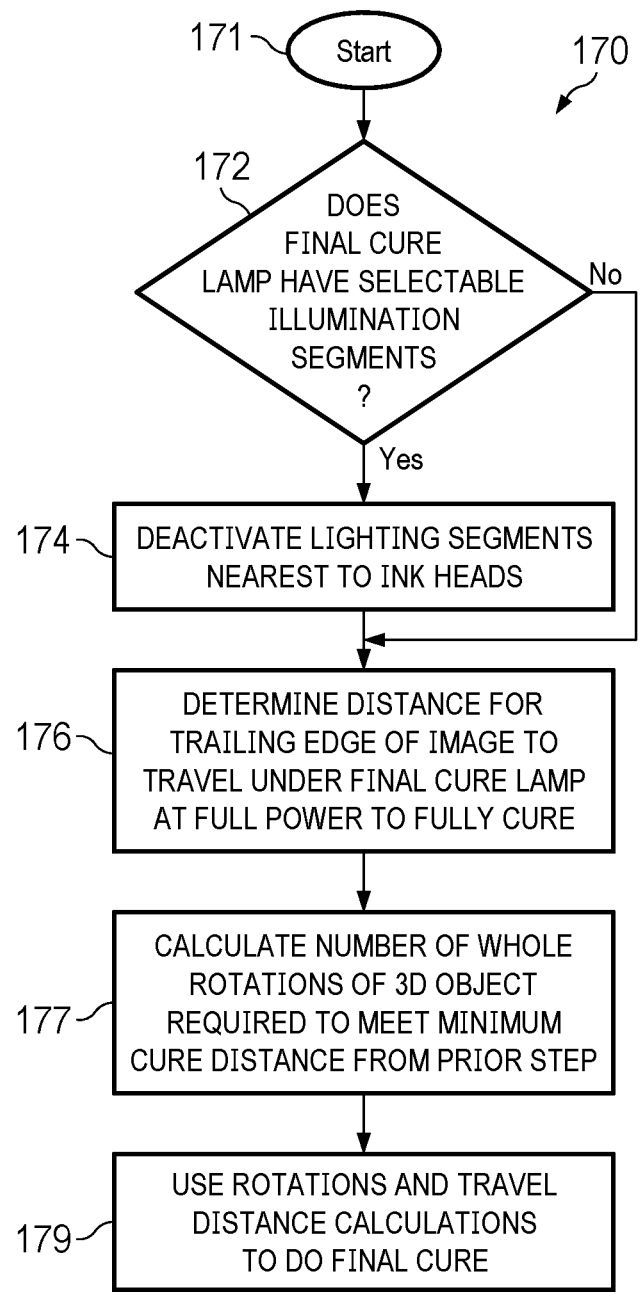

FIG. 27 shows process steps for adjusting the functionality of a final cure lamp to reduce the potential for printhead fouling 170. Some cure lamps 59 utilize one or more parallel segments of LED (light emitting diodes) on their illumination surface of the lamp. For those types of lamps, the printing process of system 10 starts 171 by checking to see if the final cure lamp incorporates selectable LED segments 172. If it does, segments closest to the ink printhead are deactivated 174 in each lamp 59. If the lamp does not include selectable segments, step 174 is skipped. Then, the distance for the trailing edge of the pinned image 96 to travel under the final cure lamp when the lamp is set at full power to fully and optimally cure is determined 176. The number of whole rotations of the 3D media to meet the minimum cure distance from step 176 is calculated 177 using the formula shown in Table 4.0. The values calculated in steps 176 and 177 are then used to implement the final cure settings in the system 179. For example, assuming a non-de-activatable LED final cure lamp of 80 mm (versus a segment selectable lamp having two 40 mm segments), a calculated PSF equals [(8 rev/s×5 mm/rev×238.7 mm×143 mJ/cm$^2$)/(800 mm lamp length×8000 mW/cm$^2$×20 mm)=0.11 or 11%]. Therefore, the number of turns required equals [(8 rev/s×238.7 mm×146 mJ/cm$^2$)/(20 mm×8000 mW/cm$^2$)=1.74 turns], which would be rounded to the next higher integer of two (2) turns to ensure even image coverage. If an operator utilizes a less powerful lamp, for example 4000 mW/cm$^2$, the PSF would then double to 0.21 and the number of turns would increase from two (2) to four (4) turns.

While I have shown my invention in one form, it will be obvious to those skilled in the art that it is not so limited but is susceptible of various changes and modifications without departing from the spirit thereof.

Having set forth the nature of the invention, what is claimed is:

1. A method for printing on the surface of an axially symmetric single piece of media, comprising the steps of:
   a. loading said media onto a printing carriage;
   b. moving said loaded printing carriage into a printing tunnel holding a plurality of inkjet printing heads;
   c. positioning the height and angle of said printing carriage relative to said inkjet printing heads so that a targeted surface area of said media is proximal to each said printing head;
   d. advancing said media along a linear path within said printing tunnel while expressing ink onto the surface of said media within successive targeted surface areas while rotating said media;
   e. during said expressing of ink onto the surface of said media, adjusting the height and angle of said printing carriage such that said targeted surface area remains within an optimal jetting zone of each print head, wherein said step of adjusting the height and angle of said printing carriage comprises the steps of:
      i. raising said printing carriage with a pair of extendable linear actuators to position said media proximal to said inkjet printing heads; and,
      ii. differentially advancing said linear actuators such that said media held by said printing carriage is canted relative to said inkjet printing heads to maintain said optimal jetting zone;
   f. partially curing expressed ink within each targeted surface area with a UV light source during media rotation to coalesce said ink into a gelled state; and,
   g. further curing said expressed ink onto said media surface until fully hardened.

2. The method as recited in claim 1, further comprising the step of configuring said plurality of inkjet printing heads into either a staggered or linear spacing arrangement relative to one another.

3. The method as recited in claim 2, wherein said media surface presents a constant slope to said inkjet printing heads as it advances within said printing tunnel such that said carriage positioning step occurs as a static single event just prior to said step of expressing ink onto the surface of said media.

4. The method as recited in claim 3, wherein said step of partially curing said ink comprises activating said UV light source such that a beam field of UV light is formed, and wherein said UV beam field is directed downward and away from each of said plurality of inkjet printing heads in order to minimize the potential impingement of UV light reflections upon the nozzles of said inkjet printing heads.

5. The method as recited in claim 4, wherein said step of partially curing expressed ink within each targeted surface further includes the step of rotating said expressed ink at least 180 radial degrees away from said point of expressing ink prior to entering said beam field.

6. The method as recited in claim 4, wherein said step of moving said expressed ink into said beam field comprises the step of moving said image into a zone of illumination positioned along the direction of rotation of said media and wherein said beam field comprises an external edge and an internal edge relative to the central axis of rotation of said media, and wherein said external edge forms a point of tangency along the surface of said media, and wherein the radial location of said point of tangency comprises a range of between plus or minus 45 degrees from 270 degrees radially around the axis of rotation of said media relative to the direction of rotation of said media.

7. The method as recited in claim 1, wherein said media loading step comprises affixing said media to a rotatable spindle at the ends of said media, said spindle supported by said printing carriage while rotating said media at a selectable rate in response to received electrical signals.

8. The method as recited in claim 7, further comprising the step of configuring said plurality of inkjet printing heads into either a staggered or linear spacing arrangement relative to one another.

9. The method as recited in claim 1, further comprising the step of canting the position of said UV light source in order to adjust the angle of UV impingement relative to the surface of said media.

10. The method as recited in claim 9, wherein said step of partially curing said expressed ink further comprises the step of creating a UV beam field from said UV lamp source and adjusting the position of said UV light source proximally and distally relative to the media surface in order to adjust said UV beam field to accommodate varying sizes of media.

11. The method as recited in claim 10, wherein said step of moving said expressed ink into said beam field comprises the step of moving said image into a zone of illumination positioned along the direction of rotation of said media and wherein said beam field comprises an external edge and an internal edge relative to the central axis of rotation of said media, and wherein said external edge forms a point of tangency along the surface of said media, and wherein the radial location of said point of tangency comprises a range of between plus or minus 45 degrees from 270 degrees radially around the axis of rotation of said media relative to the direction of rotation of said media.

12. A method for printing on the surface of an axially symmetric single piece of media, comprising the steps of:
  a. loading a piece of media onto a controllable spindle supported by a printing carriage and slidably moving said printing carriage along a linear printing path and into a tunnel for printing images thereon;
  b. adjusting the position of said printing carriage within said printing tunnel so that the surface of said media is within a suitable jetting zone of at least one inkjet printing head within a plurality of ink jet printer heads supported above said media in said printing tunnel;
  c. configuring said inkjet printing heads into either a staggered or linear position relative to one another;
  d. wherein said position adjustment step of said printing carriage includes the steps of canting and raising said printing carriage relative to said linear printing path so that the longitudinal rotational axis of said media is canted relative to said linear printing path, wherein said position adjustment step further includes the steps of
    i. raising said printing carriage with a pair of extendable linear actuators to position said media proximal to said inkjet printing heads; and,
    ii. differentially advancing said linear actuators such that said media held by said printing carriage is canted relative to said inkjet printing heads to maintain said suitable jetting zone;
  e. expressing ink onto the surface of said media while said media rotates and advances along said linear printing path; and,
  f. curing said ink deposited on the surface of said media with at least one UV light source.

13. The method as recited in claim 12, wherein said media loading step comprises affixing said media to the ends of said media on a rotatable spindle, said spindle supported by said printing carriage while rotating said media at a selectable rate in response to received electrical signals.

14. The method as recited in claim 12, further comprising the step of configuring said plurality of inkjet printing heads within said printing tunnel into either a staggered or linear spacing arrangement relative to one another.

15. The method as recited in claim 14, further comprising the step of canting the position of said UV light source in order to adjust the angle of UV impingement relative to the surface of said media.

16. The method as recited in claim 15, further including the step while expressing ink onto the surface of said rotating media, advancing said expressed ink into a UV illumination beam field positioned along the direction of rotation of said media and wherein said beam field comprises an external edge and an internal edge relative to the central axis of rotation of said media, and wherein said external edge forms a point of tangency along the surface of said media, and wherein the radial location of said point of tangency comprises a range of between plus or minus 45 degrees from 270 degrees radially around the axis of rotation of said media relative to the direction of rotation of said media.

17. A method for printing on the surface of an axially symmetric single piece of media, comprising the steps of:
  a. loading a piece of media onto an electrically rotatable spindle supported within a printing carriage and slidably moving said carriage into a tunnel having a plurality of positionally reconfigurable inkjet printing heads suspended above said media;
  b. raising and tilting said printing carriage relative to said printing tunnel so that the surface of said media is spaced within a suitable jetting zone of said inkjet printing heads supported above said media in said printing tunnel;
  c. expressing ink onto the surface of said media while said media rotates and advances along a linear printing path within said printing tunnel; and, d. partially curing expressed ink within each targeted surface area with a UV light source during media rotation to coalesce said ink into a gelled state, wherein said step of partially curing said ink comprises activating said UV light source such that a beam field of UV light is formed, and wherein said UV beam field is directed downward and away from each of said plurality of inkjet printing heads in order to minimize the potential impingement of UV light reflections upon the nozzles of said inkjet printing heads; and, e. further curing said expressed ink onto said media surface until fully hardened.

18. A method for printing on the surface of a piece of media, comprising the steps of:

a. loading a piece of media onto an electrically rotatable spindle supported within a printing carriage and slidably moving said carriage into a tunnel having a plurality of positionally reconfigurable inkjet printing heads suspended above said media;

b. raising and tilting said printing carriage relative to said printing tunnel so that the surface of said media is spaced within a suitable jetting zone of said inkjet printing heads supported above said media in said printing tunnel, wherein said raising and tilting step comprises extending a least one linear actuator supporting said carriage;

c. expressing ink onto the surface of said media while said media rotates and advances along a linear printing path within said printing tunnel; and, d. partially curing expressed ink within each targeted surface area with a UV light source during media rotation to coalesce said ink into a gelled state, wherein said step of partially curing said ink comprises directing UV light from said UV light source downward and away from each of said inkjet printing head in order to minimize the potential impingement of UV light reflections upon the nozzles of said inkjet printing heads; and, e. further curing said expressed ink onto said media surface until fully hardened.

* * * * *